United States Patent
Omote et al.

(10) Patent No.: US 7,228,276 B2
(45) Date of Patent: Jun. 5, 2007

(54) SOUND PROCESSING REGISTERING A WORD IN A DICTIONARY

(75) Inventors: Masanori Omote, Kanagawa (JP); Helmut Lucke, Tokyo (JP)

(73) Assignee: Sony Corporation, Tokyo (JP)

( * ) Notice: Subject to any disclaimer, the term of this patent is extended or adjusted under 35 U.S.C. 154(b) by 690 days.

(21) Appl. No.: 10/296,797

(22) PCT Filed: Apr. 1, 2002

(86) PCT No.: PCT/JP02/03248

§ 371 (c)(1),
(2), (4) Date: Jul. 21, 2003

(87) PCT Pub. No.: WO02/080141

PCT Pub. Date: Oct. 10, 2002

(65) Prior Publication Data
US 2004/0030552 A1 Feb. 12, 2004

(30) Foreign Application Priority Data
Mar. 30, 2001 (JP) .............................. 2001-97843
Mar. 14, 2002 (JP) .............................. 2002-69603

(51) Int. Cl.
*G10L 21/00* (2006.01)
*G10L 15/18* (2006.01)

(52) U.S. Cl. ...................................................... 704/243
(58) Field of Classification Search ................. 704/243
See application file for complete search history.

(56) References Cited

U.S. PATENT DOCUMENTS 6,236,965 B1 * 5/2001 Kim et al. .................. 704/254
6,243,680 B1 * 6/2001 Gupta et al. ................. 704/260

FOREIGN PATENT DOCUMENTS

| JP | 57-45680 | 3/1982 |
| JP | 61-25199 | 2/1986 |
| JP | 2002-160185 | 6/2002 |

OTHER PUBLICATIONS

Lawrence Rabiner, Biing-Hwang Juang, Fundamentals of Speech Recognition, Prentice-Hall PTR, 1993, pp. 267-274.
Naoto Iwahashi, Masanori Tamura, "Chikaku Joho Kara no Gainen Kozo no Chushutsu ni Motoduku Onsei Nyuryoku ni yoru Gengo Kakutoku", Information Processing Society of Japan Kenkyu Hokoku [Onsei Gengo Joho Shori], vol. 99, No. 91, Oct. 29, 1999, 28-1, pp. 1 to 8.
Atsushi Nakamura, "Gijiteki Gakushu Deta o Mochiita Tango Spotting Yo Gabeji Model Gakusbu Ho", The Institute of Electronics, Information and Communication Engineers Kenkyu Hokoku [Onsei], vol. 95, No. 431, Dec. 15, 1995, SP95-107, pp. 99-104.

* cited by examiner

*Primary Examiner*—Susan McFadden
(74) *Attorney, Agent, or Firm*—Frommer Lawrence & Haug LLP; William S. Frommer; Paul A. Levy

(57) ABSTRACT

The present invention relates to a voice recognition apparatus capable of easily registering a word which has not been registered. The registering of an unregistered word into a dictionary can be easily performed without causing a significant increase in the size of the dictionary. The clustering unit detects a cluster (detected cluster) to which a new unregistered word is to be added as a new member, from existing clusters obtained by clustering unregistered words. The unregistered word is added as a new member to the detected cluster, and the cluster is divided depending on the members of the cluster such that unregistered words which are acoustically similar to each other belong to the same cluster. The maintenance unit updates the word dictionary on the basis of the result of the clustering. The present invention may be applied to a robot including a voice recognition apparatus.

30 Claims, 16 Drawing Sheets

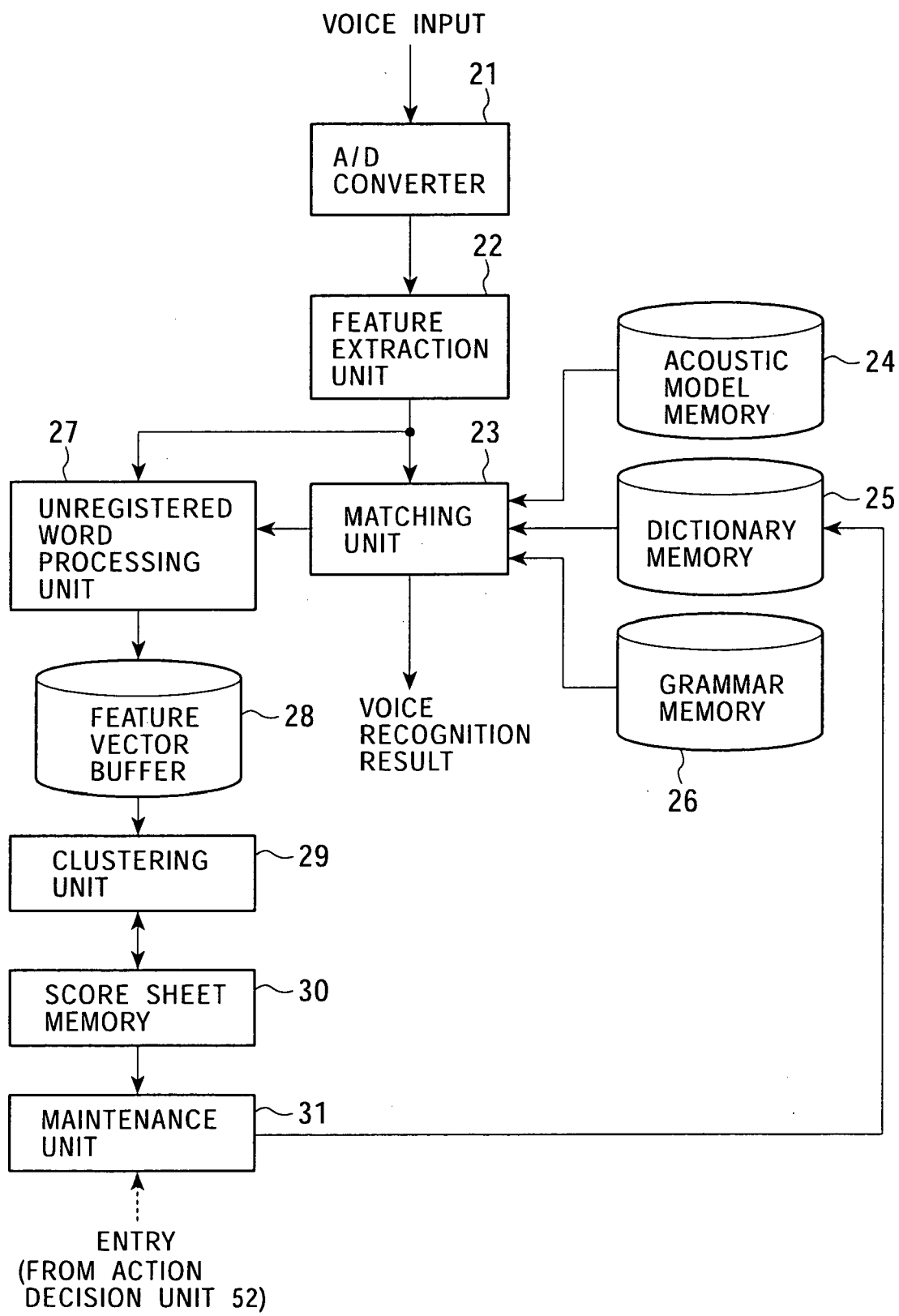

FIG. 5

WORD DICTIONARY

| ENTRY | | PHONEME SEQUENCE |
|---|---|---|
| boku | [僕] | boku |
| chigau | [違う] | chigau |
| doko | [どこ] | doko |
| genki | [元気] | geNki |
| iro | [色] | iro |
| janai | [じゃない] | janai |
| kirai | [嫌い] | kirai |
| kudasai | [ください] | kudasai |

FIG. 6

```
──────── GRAMMATICAL RULE ────────
$col     = [kono | sono] iro wa;
$this    = kore [(ga | wa | mo)];
$neg     = (Chagau | iie) [$sil];
$null    = $sil;
$des     = (desu | da) [yo] | yo;
$not     = janai [yo];
$color1  = $null | $neg | [$neg] $col | [$neg] $this;
$color2  = [iro] (desu | janai | da) [yo];
$pat1    = $color1 $garbage $color2;
```

FIG. 7

| ID | PHONEME SEQUENCE | FEATURE VECTOR SEQUENCE |
|---|---|---|
| 1 | - - - - | - - - - |
| 2 | - - - - | - - - - |
| ⋮ | ⋮ | ⋮ |
| N | - - - - | - - - - |
| N+1 | - - - - | - - - - |

FIG. 8

| ID | PHONEME SEQUENCE | CLUSTER NUMBER | REPRESENTATIVE MEMBER ID | SCORE (DISTANCE) | | | | | | |
|---|---|---|---|---|---|---|---|---|---|---|
| | | | | 1 | 2 | 3 | ... | N | N+1 |
| 1 | ... | 1 | 1 | s(1,1) | s(1,2) | s(1,3) | ... | s(1,N) | s(1,N+1) |
| 2 | ... | 2 | 2 | s(2,1) | s(2,2) | s(2,3) | ... | s(2,N) | s(2,N+2) |
| 3 | ... | 1 | 1 | s(3,1) | s(3,2) | s(3,3) | ... | s(3,N) | s(3,N+3) |
| ... | ... | ... | ... | ... | ... | ... | ... | ... | ... |
| N | ... | 1 | 1 | s(N,1) | s(N,2) | s(N,3) | ... | s(N,N) | s(N,N+1) |
| N+1 | ... | 2 | 2 | s(N+1,1) | s(N+1,2) | s(N+1,3) | ... | s(N+1,N) | s(N+1,N+1) |

FIG. 12

| PHONEME SEQUENCE | UTTERED WORD |
|---|---|
| doroa: | 風呂 × 1; |
| kuro | 風呂 × 3; |
| Nfuro | 風呂 × 20; |
| NhoNn | 本 × 18; |
| hoNN | 本 × 6; |
| NhoNda | 本 × 10; |
| NhoNde:su | 本 × 4; |
| ohoN | オレンジ × 1; 本 × 19; |
| hoNgdawasoNre:a: | 本 × 2; |
| a:modori: | 緑色 × 11; |
| omidori: | 緑色 × 10; |
| e:imidori: | 緑色 × 3; |
| Nmidori: | 緑色 × 5; |
| a:midori:iroiresu | 緑色 × 4; |
| Nro:ka | 廊下 × 10; |
| Nro:kaNa | 廊下 × 10; |

FIG. 15

| ID | PHONEME SEQUENCE | FEATURE VECTOR SEQUENCE (UTTERANCE INFORMATION) | STORAGE TIME |
|---|---|---|---|
| 1 | ... | ... | ... |
| 2 | ... | ... | ... |
| --- | --- | --- | --- |
| N | ... | ... | ... |
| N+1 | ... | ... | ... |

SOUND PROCESSING REGISTERING A WORD IN A DICTIONARY

This application is a 371 of PCT/JPT/02/03248 Apr. 1, 2002

TECHNICAL FIELD

The present invention relates to a voice recognition apparatus, and more particularly, to a voice recognition apparatus capable of easily updating a dictionary in which a word or a phrase to be recognized is registered.

BACKGROUND ART

In conventional voice recognition apparatuses, recognition of a voice uttered by a user is performed by referring to a dictionary in which words to be recognized are registered.

Therefore, in the voice recognition apparatus, only words which are registered in the dictionary (hereinafter, such words will be referred to simply as registered words) can be recognized, and words which are not registered in the dictionary cannot be recognized. Herein, words which are not registered in the dictionary are referred to as unregistered words. In the conventional voice recognition apparatus, if an utterance made by a user includes an unregistered word, the unregistered word is recognized as one of words (registered words) registered in the dictionary, and thus the result of recognition of the unregistered word becomes wrong. If an unregistered word is recognized incorrectly, the incorrect recognition can influence recognition of a word prior to or subsequent to the unregistered word, that is, can cause such a word to be recognized incorrectly.

Therefore, it is required to properly deal with unregistered words so as to avoid the above problem. To this end, various techniques have been proposed.

For example, Japanese Unexamined Patent Application Publication No. 9-81181 discloses a voice recognition apparatus in which a garbage model for detecting an unregistered word and an HMM (Hidden Markov Model) associated with phonemes such as vowels are simultaneously used so as to limit phoneme sequences associated with the unregistered word thereby making it possible to detect the unregistered word without needing complicated calculations.

As another example, Japanese Patent Application No. 11-245461 discloses an information processing apparatus in which when a word set including an unregistered word is given, the similarity between the unregistered word which is not included in a database and a word included in the database is calculated on the basis of the concepts of words, and a sequence of properly arranged words is produced and output.

As still another example, "Dictionary Learning: Performance Through Consistency" (Tilo Sloboda, Proceedings of ICASSP 95, vol. 1, pp. 453–456, 1995) discloses a technique in which phoneme sequences corresponding to voice periods of words are detected and phoneme sequences which are acoustically similar to each other are deleted using a confusion matrix thereby effectively constructing a dictionary including variants.

As still another example, "Estimation of Transcription of Unknown Word from Speech Samples in Word Recognition" (Katsunobu Ito, et al., The Transactions of the Institute of Electronics, Information, and Communication Engineers, Vol. J83-D-II, No. 11, pp. 2152–2159, November, 2000) discloses a technique of improving estimation accuracy of a phoneme sequence when the phoneme sequence is estimated from a plurality of speech samples and an unknown (unregistered) word is registered in a dictionary.

One typical method for dealing with an unregistered word is to, if an unregistered word is detected in an input voice, register the unregistered word into a dictionary and treat it as an registered word thereafter.

In order to register an unregistered word into a dictionary, it is required to first detect a voice period of that unregistered word and then recognize the phoneme sequence of the voice in the voice period. The recognition of the phoneme sequence of a voice can be accomplished, for example, by a method known as a phoneme typewriter. In the phoneme typewriter, a phoneme sequence corresponding to an input voice is basically output using a garbage model which accepts any phonemic change.

When an unregistered word is registered into a dictionary, it is required to cluster the phoneme sequence of the unregistered word. That is, in the dictionary, the phoneme sequence of each word is registered in the form of a cluster corresponding to the word, and thus, to register an unregistered word into the dictionary, it is required to cluster the phoneme sequence of the unregistered word.

One method of clustering the phoneme sequence of an unregistered word is to input, by a user, an entry (for example, a pronunciation of the unregistered word) indicating the unregistered word and then cluster the phoneme sequence of the unregistered word into a cluster indicated by the that entry. However, in this method, the user has to do a troublesome task to input the entry.

Another method is to produce a new cluster each time an unregistered word is detected such that the phoneme sequence of the unregistered word is clustered into the newly produced cluster. However, in this method, an entry corresponding to the new cluster is registered into a dictionary each time an unregistered word is detected, and thus the size of the dictionary increases as unregistered words are registered. As a result, a greater time and a greater amount of process are necessary in voice recognition performed thereafter.

DISCLOSURE OF INVENTION

In view of the above, it is an object of the present invention to provide a technique of easily registering an unregistered word into a dictionary without causing a significant increase in the size of the dictionary.

The present invention provides a voice recognition apparatus comprising cluster detection means for detecting, from existing clusters obtained by clustering voices, a cluster to which an input voice is to be added as a new member; cluster division means for employing the input voice as the new member of the cluster detected by the cluster detection means and dividing the cluster depending on members of the cluster; and update means for updating the dictionary on the basis of a result of division performed by the cluster division means.

The present invention provides a voice recognition method comprising the steps of detecting, from existing clusters obtained by clustering voices, a cluster to which the input voice is to be added as a new member; employing the input voice as the new member of the cluster detected in the cluster detection step and dividing the cluster depending on members of the cluster; and updating the dictionary on the basis of a result of division performed in the cluster division step.

The present invention provides a program comprising the steps of detecting, from existing clusters obtained by clustering voices, a cluster to which the input voice is to be added as a new member; employing the input voice as the new member of the cluster detected in the cluster detection step and dividing the cluster depending on members of the cluster; and updating the dictionary on the basis of a result of division performed in the cluster division step.

The present invention provides a storage medium including a program, stored therein, comprising the steps of detecting, from existing clusters obtained by clustering voices, a cluster to which the input voice is to be added as a new member; employing the input voice as the new member of the cluster detected in the cluster detection step and dividing the cluster depending on members of the cluster; and updating the dictionary on the basis of a result of division performed in the cluster division step.

In the present invention, from existing clusters obtained by clustering voices, a cluster to which an input voice is to be added as a new member is detected. The input voice is added as a new member to the detected cluster and the cluster is divided depending on the members of the cluster. In accordance with a result of the division, the dictionary is updated.

BRIEF DESCRIPTION OF THE DRAWINGS

FIG. 4 is a block diagram showing an example of a construction of a voice recognition apparatus according to an embodiment of the present invention, wherein the voice recognition apparatus is used as a voice recognition unit of the robot shown in FIG. 1.

FIG. 5 is a diagram showing a word dictionary.

FIG. 6 is a diagram showing grammatical rules.

FIG. 7 is a diagram showing contents stored in a feature vector buffer of the voice recognition unit shown in FIG. 4.

FIG. 8 is a diagram showing a score sheet.

FIG. 12 is a diagram showing a result of a simulation.

FIG. 15 is a diagram showing contents stored in a feature vector buffer of the voice recognition unit shown in FIG. 14.

BEST MODE FOR CARRYING OUT THE INVENTION

Figure 1:
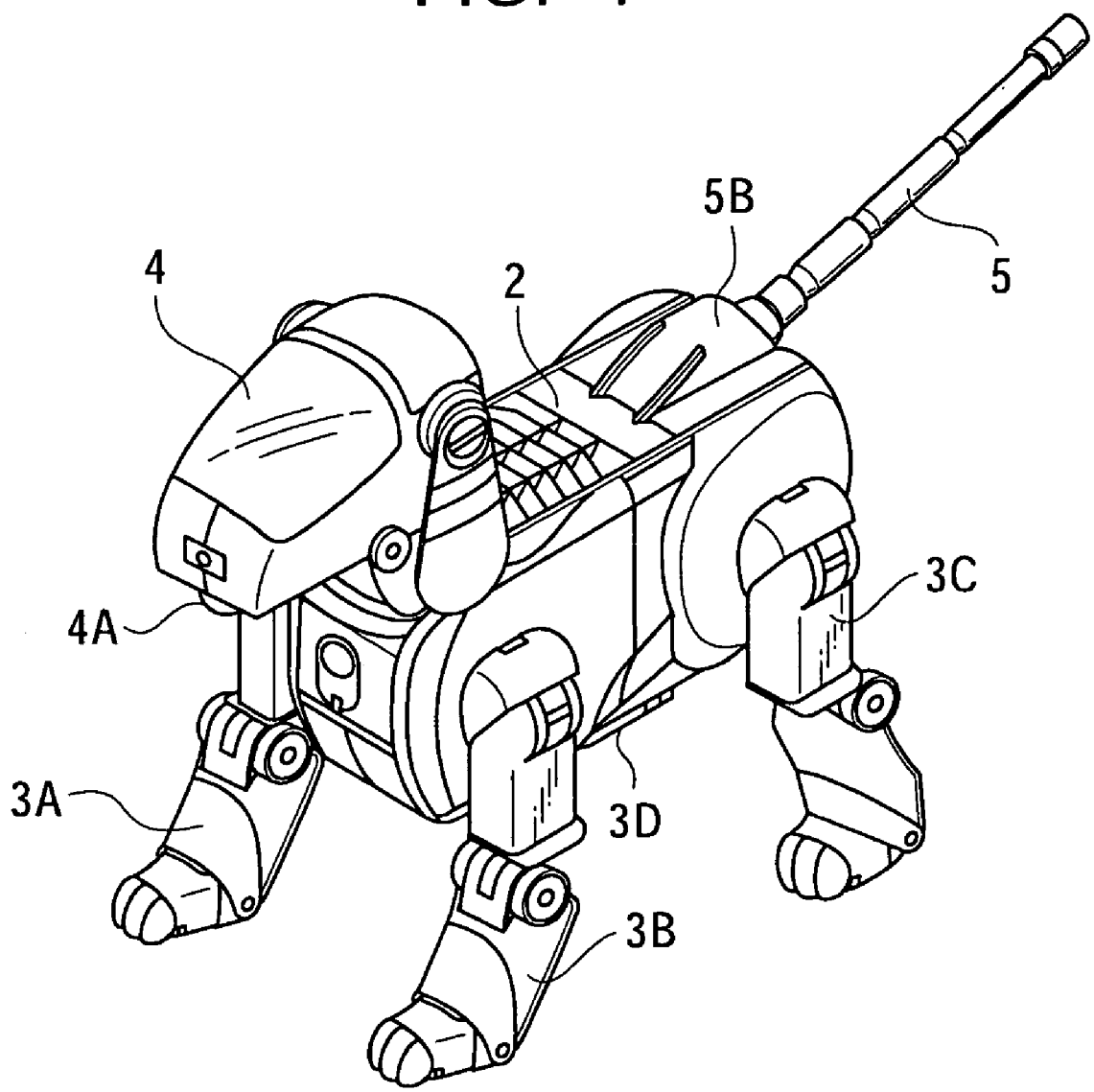
FIG. 1 is a perspective view showing an example of an outward structure of a robot according to an embodiment of the present invention.
Figure 2:
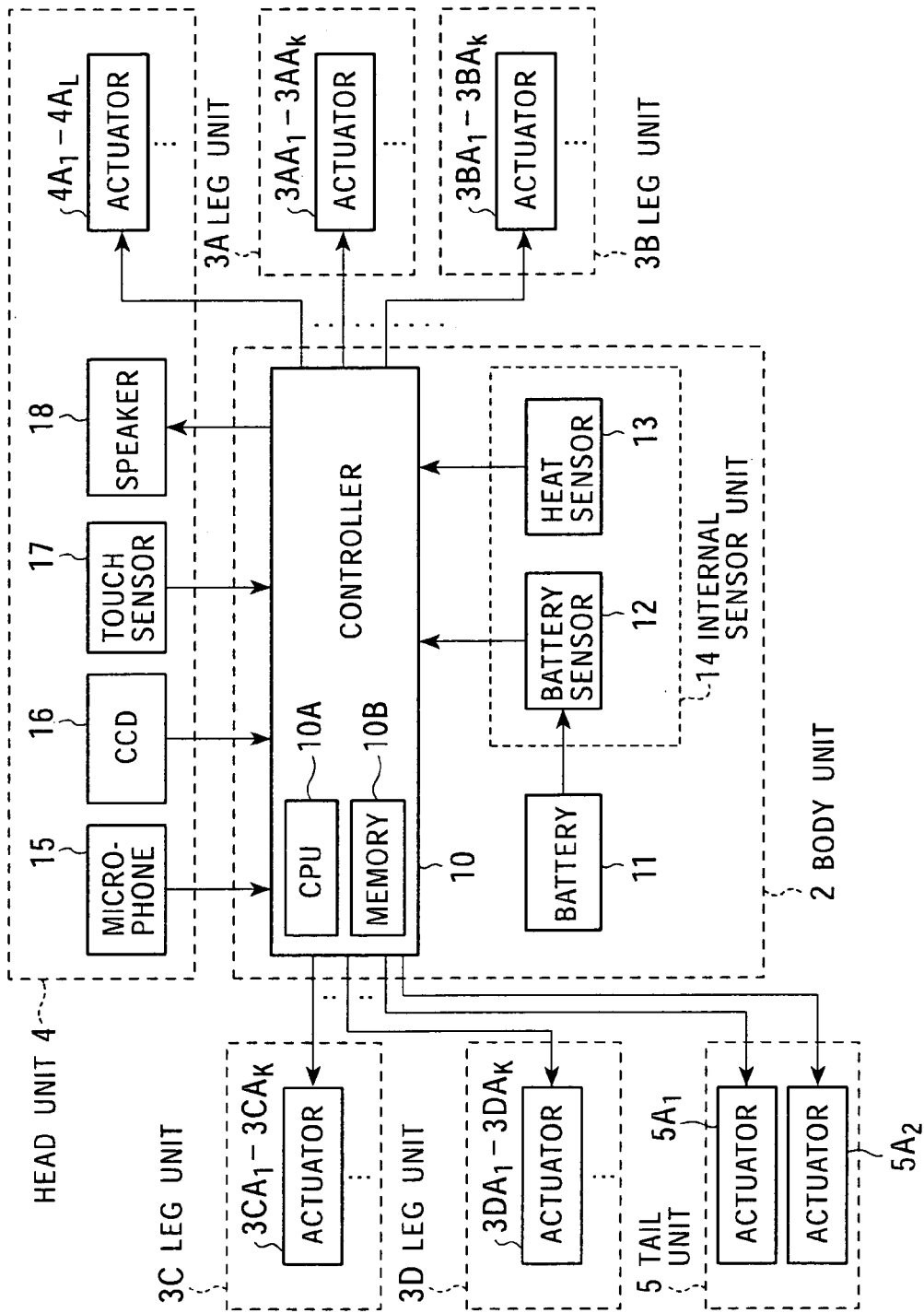
FIG. 2 is a block diagram showing an example of an internal structure of the robot.

FIG. 1 shows an example of an outward structure of a robot according to an embodiment of the present invention, and FIG. 2 shows an example of an electric configuration thereof.

In the present embodiment, the robot is constructed into the form of an animal having four legs, such as a dog, wherein leg units 3A, 3B, 3C, and 3D are attached, at respective four corners, to a body unit 2, and a head unit 4 and a tail unit 5 are attached, at front and bock ends, to the body unit 2.

The tail unit 5 extends from a base 5B disposed on the upper surface of the body unit 2 such that the tail unit 5 can bend or shake with two degree of freedom.

Inside the body unit 2, there are disposed a controller 10 for generally controlling the robot, a battery 11 serving as a power source of the robot, and an internal sensor unit 14 including a battery sensor 12 and a heat sensor 13.

On the head unit 4, there are disposed, at properly selected position, a microphone 15 serving as an ear, a CCD (Charge Coupled Device) camera 16 serving as an eye, a touch sensor 17 serving as a sense-of-touch sensor, and a speaker 18 serving as a mouth. A lower jaw unit 4A serving as a lower jaw of the mouth is attached to the head unit 4 such that the lower jaw unit 4A can move with one degree of freedom. The mouth of the robot can be opened and closed by moving the lower jaw unit 4A.

As shown in FIG. 2, actuators $3AA_1$ to $3AA_K$, $3BA_1$ to $3BA_K$, $3CA_1$ to $3CA_K$, $3DA_1$ to $3DA_K$, $4A_1$ to $4A_L$, $5A_1$, and $5A_2$ are respectively disposed in joints for joining parts of the leg units 3A to 3D, joints for joining the leg units 3A to 3D with the body unit 2, a joint for joining the head unit 4 with the body unit 2, a joint for joining the head unit 4 with the lower jaw unit 4A, and a joint for joining the tail unit 5 with the body unit 2.

The microphone 15 disposed on the head unit 4 collects a voice (sound) including an utterance made by a user from the environment and transmits an obtained voice signal to the controller 10. The CCD camera 16 takes an image of the environment and transmits an obtained image signal to the controller 10.

The touch sensor 17 is disposed on an upper part of the head unit 4. The touch sensor 17 detects a pressure applied by the user as a physical action such as "rubbing" or "tapping" and transmits a pressure signal obtained as the result of the detection to the controller 10.

The battery sensor 12 disposed in the body unit 2 detects the remaining capacity of the battery 11 and transmits the result of the detection as a battery remaining capacity signal to the controller 10.

The heat sensor 13 detects heat in the inside of the robot and transmits information indicating the detected heat, as a heat signal, to the controller 10.

The controller 10 detects a CPU (Central Processing Unit) 10A and a memory 10B. The controller 10 performs various processes by executing, using the CPU 10A, a control program stored in the memory 10B.

The controller 10 detects an environment state, a command given by a user, and an action of a user applied to the robot on the basis of the voice signal, the image signal, the pressure signal, the battery remaining capacity signal, and the heat signal supplied from the microphone 15, the CCD camera 16, the touch sensor 17, the battery sensor 12, and the heat sensor 13, respectively.

On the basis of the parameters detected above, the controller 10 makes a decision as to how to act. In accordance with the decision, the controller 10 activates necessary actuators of those including actuators $3AA_1$ to $3AA_K$, $3BA_1$ to $3BA_K$, $3CA_1$ to $3CA_K$, $3DA_1$ to $3DA_K$, $4A_1$ to $4A_L$, $5A_1$, and $5A_2$, so as to nod or shake the head unit 4 or open and close the lower jaw unit 4A. Depending on the situation, the controller 10 moves the tail unit 5 or makes the robot walk by moving the leg units 3A to 3D.

Furthermore, as required, the controller 10 produces synthesized voice data and supplies it to the speaker 18 thereby generating a voice, or turns on/off or blinks LEDs (Light Emitting Diode, not shown in the figures) disposed on the eyes of the robot.

As described above, the robot autonomously acts in response to the environmental conditions.

Figure 3:
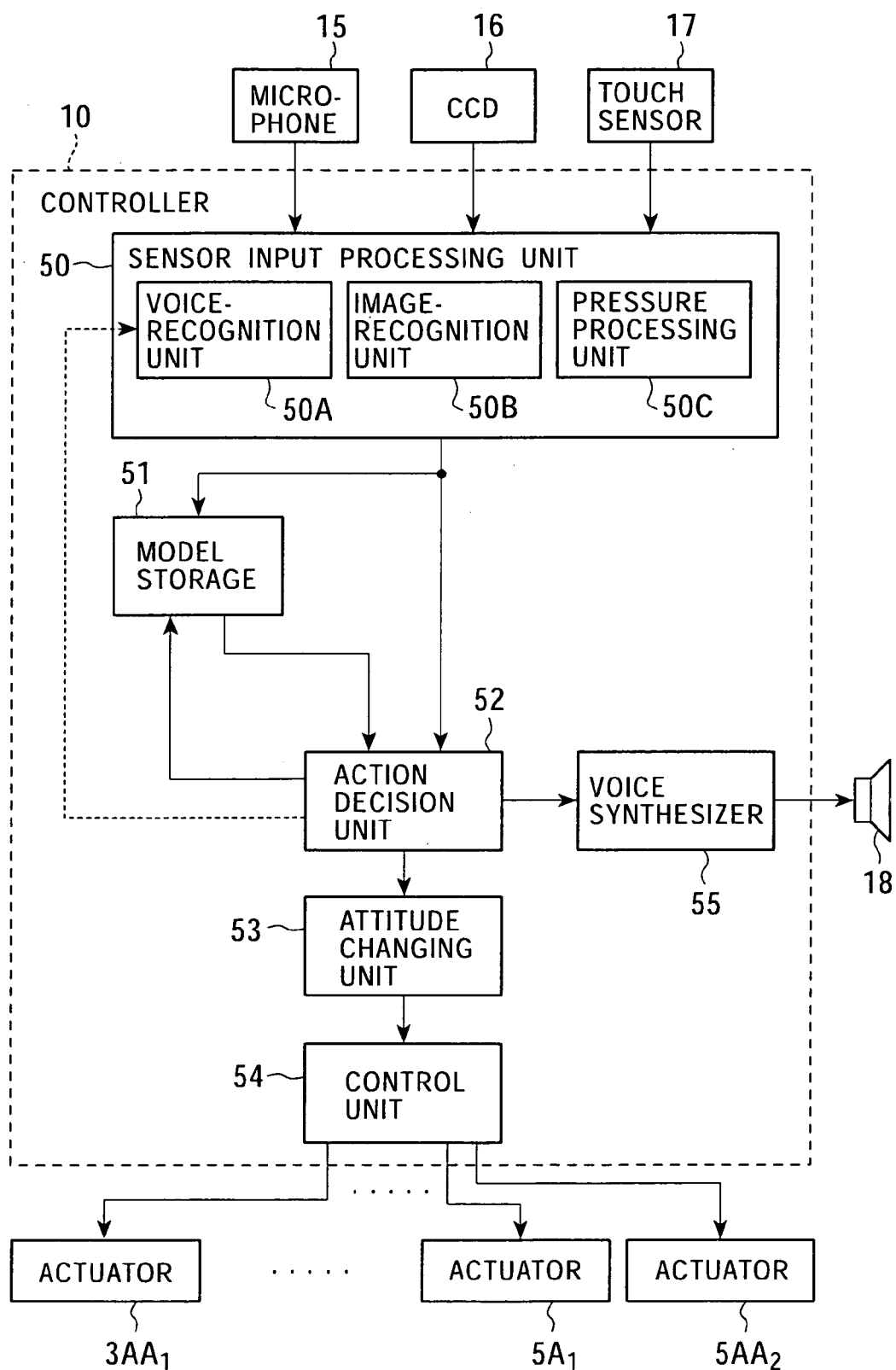
FIG. 3 is a block diagram showing an example of a functional structure of a controller of the robot shown in FIG. 1.

FIG. 3 shows the functional structure of the controller 10 shown in FIG. 2. Note that the functional structure shown in FIG. 3 is realized by executing, using the CPU 10A, the control program stored in the memory 10B.

The controller 10 includes a sensor input processing unit 50 for recognizing a specific external state, a model memory 51 for storing results of recognition performed by the sensor input processing unit 50 and representing a state of emotion, instinct, or growth, an action decision unit 52 for determining an action to be taken next in accordance with the result of recognition performed by the sensor input processing unit 50, an attitude change mechanism 53 for making the robot actually take an action in accordance with the decision made by the action decision unit 52, a control unit 54 for controlling actuators $3AA_1$ to $5A_1$ and $5A_2$, and a voice synthesis unit 55 for producing a synthesized voice.

The sensor input processing unit 50 detects specific external conditions, an action of a user applied to the robot, and a command given by the user, on the basis of the voice signal, the image signal, and the pressure signal supplied from the microphone 15, the CCD camera 16, and the touch sensor 17, respectively. Information indicating the detected conditions is supplied as state recognition information to the model memory 51 and the action decision unit 52.

More specifically, the sensor input processing unit 50 includes a voice recognition unit 50A for recognizing the voice signal supplied from the microphone 15. For example, if a given voice signal is recognized by the voice recognition unit 50A as a command such as "walk", "lie down", or "follow the ball", the recognized command is supplied as state recognition information from the voice recognition unit 50A to the model memory 51 and the action decision unit 52.

The sensor input processing unit 50 also includes an image recognition unit 50B for recognizing an image signal supplied from the CCD camera 16. For example, if the image recognition unit 50B detects, via the image recognition process, "something red and round" or a "plane extending vertical from the ground to a height greater than a predetermined value", then the image recognition unit 50B supplies information indicating the recognized state of the environment such as "there is a ball" or "there is a wall" as state recognition information to the model memory 51 and the action decision unit 52.

The sensor input processing unit 50 further includes a pressure processing unit 50C for processing a detected pressure signal supplied from the touch sensor 17. For example, if the pressure processing unit 50C detects a pressure higher than a predetermined threshold for a short duration, the pressure processing unit 50C recognizes that the robot has been "tapped (scolded)". In a case in which the detected pressure is lower in magnitude than a predetermined threshold and long in duration, the pressure processing unit 50C recognizes that that the robot has been "rubbed (praised)". Information indicating the result of recognition is supplied as state recognition information to the model memory 51 and the action decision unit 52.

The model memory 51 stores and manages an emotion model, an instinct model, and a growth model representing the states of the robot concerning emotion, instinct, and growth, respectively.

The emotion model represents the state (degree) of emotion concerning, for example, "happiness", "sadness", "angriness", and "pleasure" using values within predetermined ranges (for example, from −1.0 to 1.0), wherein the values are varied depending on the state recognition information supplied from the sensor input processing unit 50 and depending on the passage of time. The instinct model represents the state (degree) of instinct concerning, for example, "appetite", "desire for sleep", and "desire for exercise" using values within predetermined ranges, wherein the values are varied depending on the state recognition information supplied from the sensor input processing unit 50 and depending on the passage of time. The growth model represents the state (degree) of growth, such as "childhood", "youth", "middle age" and "old age" using values within predetermined ranges, wherein the values are varied depending on the state recognition information supplied from the sensor input processing unit 50 and depending on the passage of time.

The states of emotion, instinct, and growth, represented by values of the emotion model, the instinct model, and the growth model, respectively, are supplied as state information from the model memory 51 to the action decision unit 52.

In addition to the state recognition information supplied from the sensor input processing unit 50, the model memory 51 also receives, from the action decision unit 52, action information indicating a current or past action of the robot, such as "walked for a long time", thereby allowing the model memory 51 to produce different state information for the same state recognition information, depending on the robot's action indicated by the action information.

More specifically, for example, when the robot greets the user, if the user rubs the head of the robot, then action information indicating that the robot greeted the user and state recognition information indicating that the head was rubbed are supplied to the model memory 51. In this case, in response, the model memory 51 increases the value of the emotion model indicating the degree of happiness.

On the other hand, if the robot is rubbed on the head when the robot is doing a job, action information indicating that the robot is doing a job and state recognition information indicating that the head was rubbed are supplied to the model memory 51. In this case, the model memory 51 does not increase the value of the emotion model indicating the degree of "happiness".

As described above, the model memory 51 sets the values of the emotion model on the basis of not only the state recognition information but also the action information indicating the current or past action of the robot.

This prevents the robot from having an unnatural change in emotion. For example, even if the user rubs the head of the robot with intension of playing a trick on the robot when the robot is doing some task, the value of the emotion model associated with "happiness" is not increased unnaturally.

For the instinct model and the growth model, the model memory 51 also increases or decreases the values on the basis of both the state recognition information and the action information, as for the emotion model. Furthermore, when the model memory 51 increases or decreases a value of one of the emotion model, the instinct model, and the growth model, the values of the other models are taken into account.

The action decision unit 52 decides an action to be taken next on the basis of the state recognition information supplied from the sensor input processing unit 50, the state information supplied from the model memory 51, and the passage of time. The content of the decided action is supplied as action command information to the attitude changing unit 53.

More specifically, the action decision unit 52 manages a finite automaton, which can take states corresponding to the possible actions of the robot, as an action model which determines the action of the robot such that the state of the finite automaton serving as the action model is changed depending on the state recognition information supplied from the sensor input processing unit 50, the values of the model memory 51 associated with the emotion model, the instinct model, and the growth model, and the passage of time, and the action decision unit 52 employs the action corresponding to the changed state as the action to be taken next.

In the above process, when the action decision unit 52 detects a particular trigger, the action decision unit 52 changes the state. More specifically, the action decision unit 52 changes the state, for example, when the period of time in which the action corresponding to the current state has been performed has reached a predetermined value, or when specific state recognition information has been received, or when the value of the state of the emotion, instinct, or growth indicated by the state information supplied from the model memory 51 becomes lower or higher than a predetermined threshold.

Because, as described above, the action decision unit 52 changes the state of the action model not only depending on the state recognition information supplied from the sensor input processing unit 50 but also depending on the values of the emotion model, the instinct model, and the growth model of the model memory 51, the state to which the current state is changed can be different depending on the values (state information) of the emotion model, the instinct model, and the growth model even when the same state recognition information is input.

For example, when the state information indicates that the robot is not "angry" and is not "hungry", if the state recognition information indicates that "a user's hand with its palm facing up is held in front of the face of the robot", the action decision unit 52 produces, in response to the hand being held in front of the face of the robot, action command information indicating that shaking should be performed and the action decision unit 52 transmits the produced action command information to the attitude changing unit 53.

On the other hand, for example, when the state information indicates that the robot is not "angry" but "hungry", if the state recognition information indicates that "a user's hand with its palm facing up is held in front of the face of the robot", the action decision unit 52 produces, in response to the hand being held in front of the face of the robot, action command information indicating that the robot should lick the palm of the hand and the action decision unit 52 transmits the produced action command information to the attitude changing unit 53.

When the state information indicates that the robot is angry, if the state recognition information indicates that "a user's hand with its palm facing up is held in front of the face of the robot", the action decision unit 52 produces action command information indicating that the robot should turn its face aside regardless of whether the state information indicates that the robot is or is not "hungry", and the action decision unit 52 transmits the produced action command information to the attitude changing unit 53.

In addition to above-described action command information associated with motions of various parts of the robot such as the head, hand, legs, etc., the action decision unit 52 also produces action command information for causing the robot to utter. The action command information for causing the robot to utter is supplied to the voice synthesizing unit 55. The action command information supplied to the voice synthesizing unit 55 includes a text or the like corresponding to a voice to be synthesized by the voice synthesizing unit 55. If the voice synthesizing unit 55 receives the action command information from the action decision unit 52, the voice synthesizing unit 55 produces a synthesized voice in accordance with the text included in the action command information and supplies it to the speaker 18, which in turns outputs the synthesized voice.

Thus, the speaker 18 outputs a voice of a cry, a voice "I am hungry" to request the user for something, or a voice "What?" to respond to a call from the user. When a synthesized voice is output, the action decision unit 52 produces action command information to open and close the lower jaw unit 4A as required and supplies it to the attitude changing unit 53. In response, the lower jaw unit 4A is opened and closed in synchronization with outputting of the synthesized voice. This can give the user an impression that the robot is actually speaking.

In accordance with the action command information supplied from the action decision unit 52, the attitude changing unit 53 produces attitude change command information for changing the attitude of the robot from the current attitude to a next attitude and transmits it to the control unit 54.

In accordance with the attitude change command information received from the attitude changing unit 53, the control unit 54 produces a control signal for driving the actuators $3AA_1$ to $5A_1$ and $5A_2$ and transmits it to the actuators $3AA_1$ to $5A_1$ and $5A_2$. Thus, in accordance with the control signal, the actuators $3AA_1$ to $5A_1$ and $5A_2$ are driven such that the robot acts autonomously.

FIG. 4 shows an example of a construction of the voice recognition unit 50A shown in FIG. 3.

A voice signal output from the microphone 15 is supplied to an AD (Analog Digital) converter 21. The AD converter 21 samples and quantizes the voice signal in the form of an along signal supplied from the microphone 15 so as to convert it into voice data in the form of a digital signal. The resultant voice data is supplied to a feature extraction unit 22.

The feature extraction unit 22 performs, for example, MFCC (Mel Frequency Cepstrum Coefficient) analysis on voice data input thereto on a frame-by-frame basis, wherein units of frames are properly selected. The MFCCs obtained via the analysis are output in the form of a feature vector (feature parameters) to a matching unit 23 and an unregistered word period processing unit 27. Alternatively, the feature extraction unit 22 may extract, as a feature vector, linear prediction coefficients, cepstrum coefficients, a line spectrum pair, or power for each of particular frequency bands (output from filter banks).

Using the feature vector supplied from the feature extraction unit 22 and referring, as required, to the acoustic model memory 24, the dictionary memory 25, and the grammar memory 26, the matching unit 23 recognizes the voice (input voice) input to the microphone 15 on the basis of, for example, a continuous density HMM (Hidden Markov Model).

The acoustic model memory 24 stores an acoustic model representing acoustic features of respective subwords such as phonemes and syllables in a language of the voice to be recognized (wherein the acoustic model may include, in addition to the HMM, standard patterns used in the DP (Dynamic Programming) matching)). In the present embodiment, voice recognition is performed on the basis of the continuous density HMM method, and thus the HMM (Hidden Markov Model) is used as the acoustic model.

The dictionary memory 25 stores a dictionary in which words to be recognized are described in such a manner that the entry of each word is related to information (phonemic information) indicating the pronunciation of that word in the form of a cluster of phonemes.

FIG. 5 shows the word dictionary stored in the dictionary memory 25.

In the word dictionary, as shown in FIG. 5, entries of respective words are related to corresponding phoneme sequences, wherein the phoneme sequences are given in the form of clusters corresponding to the respective words. In the word dictionary shown in FIG. 5, one entry (one row in FIG. 3) corresponds to one cluster.

In the example shown in FIG. 5, each entry is represented in Roman characters and also in Japanese characters (kanji and kana characters), and each phoneme sequence is represented in Roman characters. (In this example, Japanese words "僕", "違う", "どこ", "元気", "色", "じゃない", "嫌い", and "ください" are pronounced "boku", "chigau", "doko", "genki", "iro", "janai", "kirai", and "kudasai", respectively, and correspond to English words "I", "different", "where", "fine", "color", "not", "dislike", and "please", respectively.) In the representations of the phoneme sequences, "N" indicates a syllabic nasal corresponding to a Japanese phonetic symbol "ん". Although in the example shown in FIG. 5, one phoneme sequence is described in association with each entry, a plurality of phoneme sequences may be described in association with one entry.

Referring again to FIG. 4, the grammar memory 26 stores grammatical rules indicating how those words registered in the word dictionary stored in the dictionary memory 25 are concatenated (connected).

FIG. 6 shows grammatical rules stored in the grammar memory 26. The grammatical rules shown in FIG. 6 are described in an EBNF (Extended Backus Naur Form).

In FIG. 6, one grammatical rule is described from the beginning of each row to a point at which ";" first appears. Each alphabetic character (character string) prefixed with "$" denotes a variable, and each alphabetic character (character string) with no prefix of "$" represents an entry (corresponding to an entry described in Roman characters in FIG. 5) of a word. Square brackets [ ] are used to indicate that a part enclosed therein can be omitted. "|" is used to indicate that either one of words (or variables) located before and after "|" of an entry can be selected.

More specifically, for example, in the first row of FIG. 6, the grammatical rule "$col=[kono|sono] iro wa;" indicates that variable $col is a word string of "kono iro wa" or "sono iro wa". (Herein, "kono" and "sono" are Japanese words corresponding to English words "this" and "that", respectively, and "wa" is a particle in the Japanese language having no corresponding English word.)

Although variables $sil and $garbage are not defined in the grammatical rules shown in FIG. 6, variable $sil denotes a silent acoustic model (silent model), and variable $garbage denotes a garbage model which basically allows an arbitrary transition among phonemes.

Referring again to FIG. 4, the matching unit 23 creates an acoustic model of a word (word model) by concatenating acoustic models stored in the acoustic model memory 24 in accordance with the word dictionary stored in the dictionary memory 25. Furthermore, the matching unit 23 concatenates some word models in accordance with grammatical rules stores in the grammar memory 26, and the matching unit 23 recognizes the voice input to the microphone 15 using the concatenated word models and the feature vectors in accordance with the continuous density HMM method.

More specifically, the matching unit 23 detects a sequence of word models having a highest score (likelihood) indicating the probability that a time sequence of feature vectors output from the feature extraction unit 22 is observed, and a sequence of entries corresponding to the sequence of word models is output as a result of voice recognition.

More specifically, the matching unit 23 determines the score for the sequence of word models by calculating the sum of occurrence probabilities (output probabilities) of the feature vectors of the sequence or words corresponding to the concatenated word models, and the matching unit 23 outputs, as a result of voice recognition, a sequence of entries corresponding to a sequence of word models having a highest score.

The result of the voice recognition on the voice input to the microphone 15 is output as state recognition information to the model memory 51 and the action decision unit 52.

In the example shown in FIG. 6, a grammatical rule using variable $garbage indicating a garbage model (hereinafter, such a grammatical rule will be referred to as a grammatical rule including unregistered word) "$part1=$color1 $garbage $color2;" is described in the ninth row (as counted from the top row). Thus, when this grammatical rule including unregistered word is applied, the matching unit 23 detects a voice period corresponding to variable $garbage as a voice period of an unregistered word. The matching unit 23 then detects a phoneme sequence of the unregistered word by detecting a phoneme sequence corresponding to variable $garbage described in the grammatical rule including unregistered word, wherein variable $garbage accepts arbitrary phonemic transitions. The voice period and the phoneme sequence of the unregistered word detected as the result of the voice recognition according to the grammatical rule including unregistered word are supplied from the matching unit 23 to the unregistered word period processing unit 27.

Although in the example described above, when the grammatical rule including unregistered word "$part1=$color1 $garbage $color2;" is applied, one unregistered word is detected between a phoneme sequence of a word (word sequence) indicated by variable $color1 and registered in the word dictionary and a phoneme sequence of a word (word sequence) indicated by variable $color2 and registered in the word dictionary, the present invention can also be applied to a case in which an utterance includes a plurality of unregistered words or to a case in which an unregistered word is not located between words (word sequences) registered in the word dictionary.

The unregistered word period processing unit 27 temporarily stores a sequence of feature vectors (feature vector sequence) supplied from the feature extraction unit 22. If the unregistered word period processing unit 27 receives the voice period and the phoneme sequence of the unregistered word from the matching unit 23, the unregistered word period processing unit 27 detects a feature vector sequence of the voice in that voice period from the temporarily stored feature vector sequence. The unregistered word period processing unit 27 assigns a unique ID (identification) to the phoneme sequence (unregistered word) supplied from the matching unit 23 and supplies it, together wit the phoneme sequence of the unregistered word and the feature vector sequence of the voice period, to the feature vector buffer 28.

The feature vector buffer 28 temporarily stores the ID, the phoneme sequence, and the feature vector sequence of the unregistered word, supplied from unregistered word period processing unit 27, such that they are related to each other as shown in FIG. 7.

In FIG. 7, sequential numerals starting from 1 are assigned as IDs to respective unregistered words. Therefore, for example, when the feature vector buffer 28 includes IDs, phoneme sequences, and feature vector sequences for N unregistered words already stored therein, if the matching unit 23 detects a voice period and a phoneme sequence of another unregistered word, the unregistered word period processing unit 27 assigns N+1 as an ID to the detected unregistered word, and the ID, the phoneme sequence, and the feature vector sequence of that unregistered word are stored into the feature vector buffer 28 as represented by broken lines in FIG. 7.

Referring again to FIG. 4, the clustering unit 29 calculates the scores for the unregistered word newly stored in the feature vector buffer 28 (hereinafter, such an unregistered word will be referred to as a new unregistered word) with respect to the other unregistered words already stored in the feature vector buffer 28 (hereinafter, such an unregistered word will be referred to as an already-stored unregistered word).

That is, the clustering unit 29 regards the new unregistered word as an input voice and the already-stored unregistered words as words registered in the word dictionary, and the clustering unit 29 calculates the scores of the new unregistered word with respect to the respective already-stored unregistered words, in a similar manner as with the matching unit 23. More specifically, the clustering unit 29 detects the feature vector sequence of the new unregistered word by referring to the feature vector buffer 28, and concatenates acoustic models in accordance with the phoneme sequences of the already-stored unregistered words. The clustering unit 29 then calculates the scores indicating the likelihood that the feature vector sequence of the new unregistered word is observed in the concatenated acoustic models.

As for the acoustic models used in the above process, those stored in the acoustic model memory 24 are employed.

Similarly, the clustering unit 29 calculates the score of each already-stored unregistered word with respect to the new unregistered word and updates the score sheet stored in the score sheet memory 30 using the calculated scores.

The clustering unit 29 refers to the updated score sheet and detects, from existing clusters obtained by clustering unregistered words (already-stored unregistered words), a cluster to which the new unregistered word is to be added as a new member. The clustering unit 29 adds the new unregistered word as a new member to the detected cluster and divides that cluster depending on the members of that cluster. The clustering unit 29 then updates the score sheet stored in the score sheet memory 30 on the basis of the result of the division.

The score sheet memory 30 stores the score sheet in which scores of the new unregistered word with respect to the already-stored unregistered words and scores of the already-stored unregistered words associated the new unregistered word are registered.

FIG. 8 shows the score sheet.

The score sheet includes entries in which the "ID", "phoneme sequence", "cluster number", "representative member ID", and "score" of each registered word are described.

For each unregistered word, the same "ID" and "phoneme sequence" as those stored in the feature vector buffer 28 are registered by the clustering unit 29 into the score sheet. The "cluster number" is a numeral identifying a cluster including, as a member, an unregistered word of an entry, wherein the cluster number is assigned by the clustering unit 29 and registered in the score sheet. The "representative member ID" is an ID of an unregistered word employed as a representative member of a cluster including, as a member, the unregistered word of the entry. On the basis of a representative member ID, it is possible to identify the representative member of a cluster including, as a member, an unregistered word. The representative member of a cluster is determined by the clustering unit 29, and the ID of the representative member is registered in a representative member ID field in the score sheet. The "score" is a score of an unregistered word of an entry with respect to each of the other unregistered words. As described earlier, the score is calculated by the clustering unit 29.

For example, if IDs, phoneme sequences, and feature vector sequences of N unregistered words are currently stored in the feature vector buffer 28, then the score sheet includes IDs, phoneme sequences, cluster numbers, representative member IDs, and scores of those N unregistered words.

When the ID, the phoneme sequence, and the feature vector sequence of the new unregistered word are newly stored into the feature vector buffer 28, the clustering unit 29 updates the score sheet as represented by broken lines in FIG. 8.

More specifically, the ID, the phoneme sequence, the cluster number, and the representative member ID of the new unregistered word, and also the scores (s(N+1, 1), s(N+1, 2), . . . , s(N+1, N) shown in FIG. 8) of the unregistered word with respect to the already-stored unregistered words are added to the score sheet. Furthermore, the scores (s (1, N+1), s(2, N+1), . . . , s(N, N+1) shown in FIG. 8) of the respective already-stored unregistered words with respect to the new unregistered word are added to the score sheet. Thereafter, as will be described later, cluster numbers and representative member IDs described in the score sheet are updated as required.

In the example shown in FIG. 8, s(i, j) denotes the score of an unregistered word (utterance of an unregistered word) having an ID of i with respect to an unregistered word (phoneme sequence of an unregistered word) having an ID of j.

In the score sheet (FIG. 8), the score, s(i, i), of an unregistered word (utterance of an unregistered word) having an ID of i with respect to the unregistered word (phoneme sequence of the unregistered word) having the ID of i is also registered. This score s(i, i) is calculated by the matching unit 23 when the matching unit 23 detects the phoneme sequence of the unregistered word, and thus the clustering unit 29 does not need to calculate this score.

Referring again to FIG. 4, the maintenance unit 31 updates the word dictionary stored in the dictionary memory 25 on the basis of the updated score sheet stored in the score sheet memory 30.

Herein, the representative member of a cluster is determined as follows. For example, of unregistered words included as members in a cluster, an unregistered word which is highest in the sum of scores with respect to the other unregistered words (or which is highest in mean score obtained by dividing the sum of scores by the number of the other unregistered words) is selected as the representative member of that cluster. That is, if the member ID of a member belonging to a cluster is denoted by k, a member having an ID of K ($\in$k) given by the following equation is selected as the representative member.

$$K = \max_K \{\Sigma s(k', k)\} \quad (1)$$

In equation (1), $\max_K\{\ \}$ denotes k which gives a maximum value to the value enclosed in braces { }, k' denotes, as with k, an ID of a member of the cluster, and $\Sigma$ denotes the sum taken by changing k' over all IDs of the cluster.

In the process of determining the representative member in the above-described manner, if a cluster includes one or two unregistered words as its members, the representative member can be determined without having to calculate the scores. That is, in a case in which a cluster includes only one member of an unregistered word, this one unregistered word is selected as the representative member. On the other hand, when a cluster includes only two unregistered words as members, either one of the two unregistered words may be selected as the representative member.

The method of determining the representative member is not limited to that described above. For example, of unregistered words included as members in a cluster, an unregistered word which is smallest in the sum of distances in the feature vector space from that unregistered word to the other unregistered words may be selected as the representative member of that cluster.

The voice recognition unit 50A constructed in the above-described manner performs a voice recognition process for recognizing a voice input to the microphone 15 and performs unregistered word processing on unregistered words.

Figure 9:
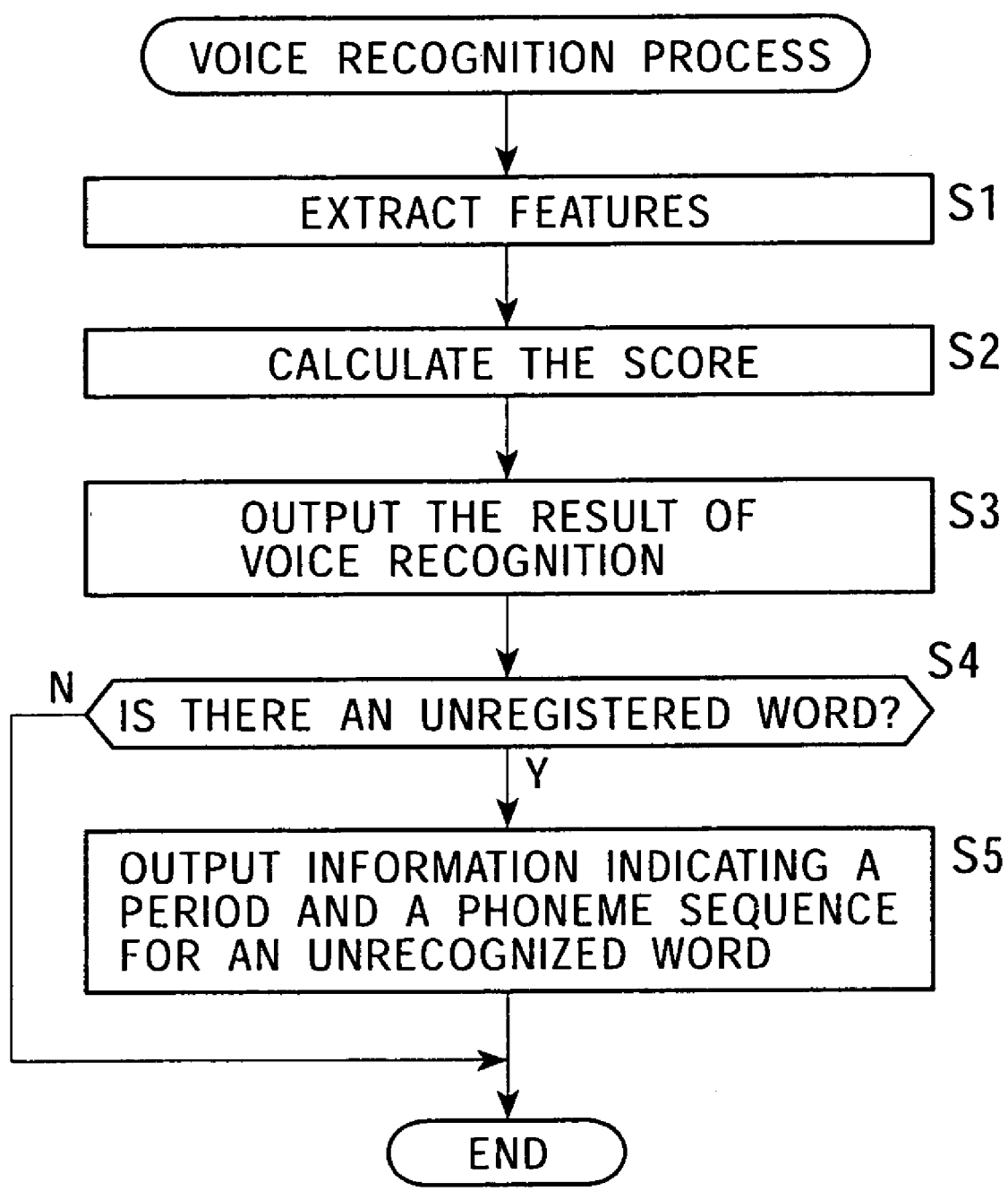
FIG. 9 is a flow chart showing a voice recognition process performed by the voice recognition unit shown in FIG. 4.

First, with reference to a flow chart shown in FIG. 9, the voice recognition process is described.

If a user utters, the uttered voice is input to the microphone 15 and converted into digital voice data by the AD converter 21. The resultant digital voice data is supplied to the feature extraction unit 22. The feature extraction unit 22 performs, in step S1, acoustic analysis on the received voice data on a frame-by-frame basis, wherein units of frames are properly determined. The feature extraction unit 22 extracts feature vector via the above acoustic analysis and supplies the obtained feature vector sequence to the matching unit 23 and the unregistered word period processing unit 27.

In step S2, the matching unit 23 calculates the scores for the feature vector sequence supplied from the feature extraction unit 23, in the above-described manner. Thereafter, the process proceeds to step S3. In step S3, on the basis of the scores obtained via the above score calculation, the matching unit 23 determines a sequence of entries of words indicating the result of voice recognition and outputs the resultant sequence of entries of words.

In the next step S4, the matching unit 23 determines whether the voice uttered by the user includes an unregistered word.

If it is determined in step S4 that the voice uttered by the user includes no unregistered word, that is, if the voice recognition result is obtained without applying the grammatical rule including unregistered word, "$pat1=$color1 $garbage $color2;", the process is ended without performing step S5.

On the other hand, if it is determined in step S4 that the voice uttered by the user include an unregistered word, that is, if the voice recognition result is obtained by applying the grammatical rule including unregistered word, "$pat1=$color1 $garbage $color2;", the process proceeds to step S5. In step S5, the matching unit 23 detects a voice period of the unregistered word by detecting a voice period corresponding to variable $garbage in the grammatical rule including unregistered word. The matching unit 23 also detects a phoneme sequence of the unregistered word by detecting a phoneme sequence corresponding to the garbage model indicated by the variable $garbage, wherein the garbage models allows an arbitrary phonemic transition. The resultant voice period and the phoneme sequence of the unregistered word are supplied to the unregistered word period processing unit 27, and the process is ended.

The feature vector sequence output from the feature extraction unit 22 is temporarily stored in the unregistered word period processing unit 27. If the unregistered word period processing unit 27 receives the voice period and the phoneme sequence of the unregistered word from the matching unit 23, the unregistered word period processing unit 27 detects a feature vector sequence of the voice in the voice period. Furthermore, the unregistered word period processing unit 27 assigns an ID to the unregistered word (phoneme sequence of the unregistered word) supplied from the matching unit 23 and supplies it, together wit the phoneme sequence of the unregistered word and the feature vector sequence of the voice period, to the feature vector buffer 28.

After the ID, the phoneme sequence, and the feature vector sequence of the new unregistered word are stored in the feature vector buffer 28 in the above-described manner, unregistered word processing is performed.

Figure 10:
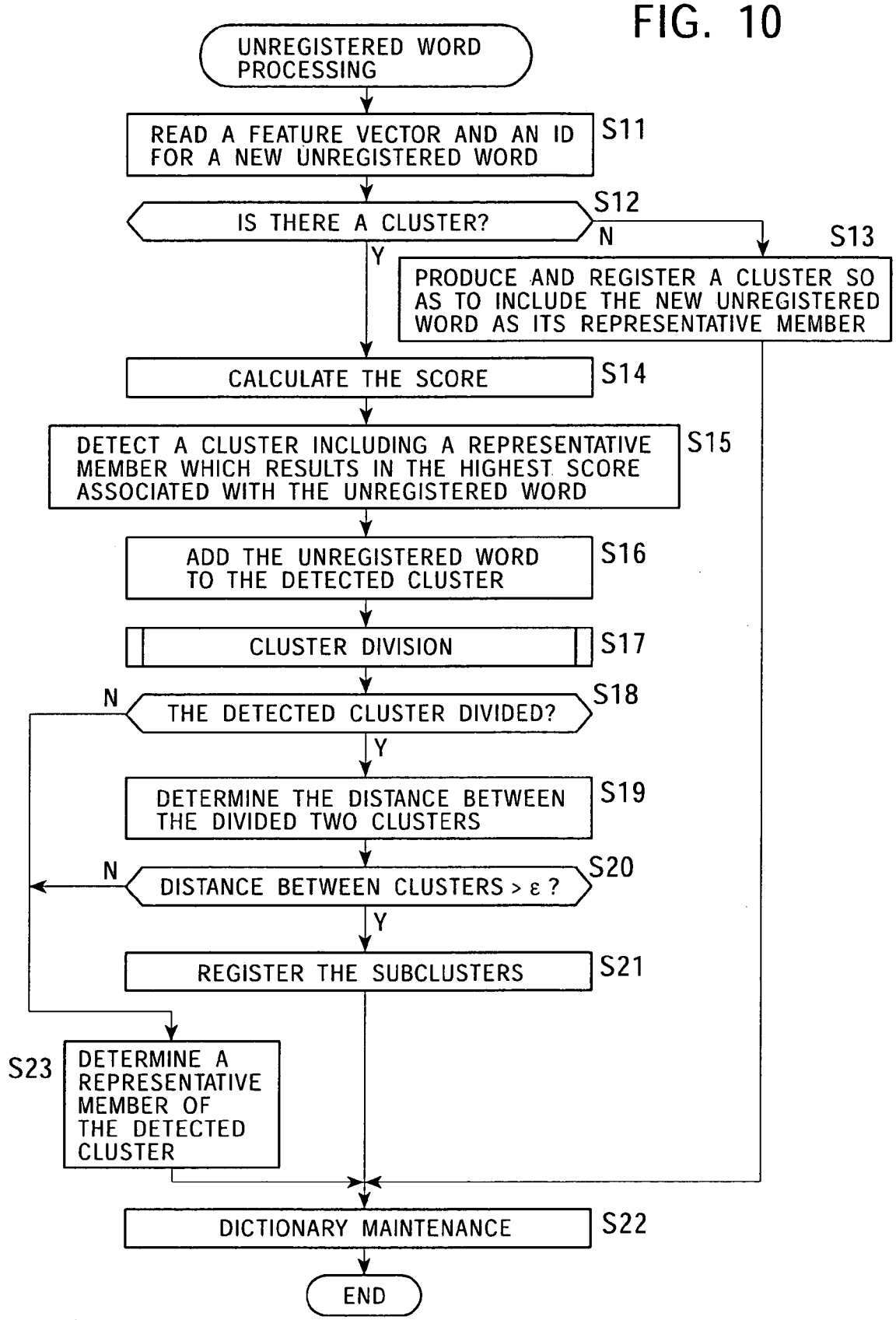
FIG. 10 is a flow chart showing the details of unregistered word processing shown in FIG. 9.

FIG. 10 is a flow chart showing the unregistered word processing.

In the first step S11 in the unregistered word processing, the clustering unit 29 reads the ID and the phoneme sequence of the new unregistered word from the feature vector buffer 28. Thereafter, the process proceeds to step S12.

In step S12, the clustering unit 29 checks the score sheet stored in the score sheet memory 30 to determine whether there is a cluster which has already been obtained (produced).

If it is determined in step S12 that there is no cluster which has already been obtained, that is, if the new unregistered word is a first unregistered word and the score sheet includes no entry of an already-stored unregistered word, then the process proceeds to step S13. In step S13, The clustering unit 29 newly produces a cluster so as to include the unregistered word as a representative member thereof, and the clustering unit 29 registers information associated with the new cluster and the new unregistered word in the score sheet stored in the score sheet memory 30 thereby updating the score sheet.

That is, the clustering unit 29 registers, into the score sheet (FIG. 8), the ID and the phoneme sequence of the new unregistered word read from the feature vector buffer 28. Furthermore, clustering unit 29 produces a unique cluster number and registers it in the score sheet as the cluster number of the new unregistered word. The clustering unit 29 registers, in the score sheet, the ID of the new unregistered word as the representative member ID of the new registered word. Thus, in this case, the new unregistered word becomes the representative member of the new cluster.

In this case, because there is no already-stored unregistered word whose score with respect to the new unregistered word should be calculated, the score calculation is not performed.

After the completion of step S13, the process proceeds to step S22. In step S22, on the basis of the score sheet updated in step S13, the maintenance unit 31 updates the word dictionary stored in the dictionary memory 25, and the process is ended.

That is, in this case, because the new cluster has been produced, the maintenance unit 31 recognizes the newly produced cluster by detecting the cluster number described in the score sheet. The maintenance unit 31 adds an entry corresponding to that cluster to the word dictionary stored in the dictionary memory 25 and registers, as a phoneme sequence of that entry, the phoneme sequence of the representative member of the new cluster, that is, in this case, the phoneme sequence of the new unregistered word.

On the other hand, if it is determined in step S12 that there is a cluster which has already been obtained, that is, if the new unregistered word is not the first unregistered word and thus the score sheet (FIG. 8) includes an entry (row) of an already-stored unregistered word, the process proceeds to step S14. In step S14, the clustering unit 29 calculates the score of the new unregistered word with respect to the already-stored unregistered word and also calculates the score of the already-stored unregistered word with respect to the new unregistered word.

More specifically, for example, if there are N already-stored unregistered words respectively assigned IDs from 1 to N, and if the ID of the new unregistered word is given as N+1, the clustering unit 29 calculates the scores s(N+1, 1), s(N+1, 2), ..., s(N+1, N) for the new unregistered word with respect to the N already-stored unregistered words, respectively, as shown in a row represented by a broken line in FIG. 8, and also calculates the scores s(1, N+1), s(2, N+1), ..., s(N, N+1) for the N already-stored unregistered words, respectively, associated with the new unregistered word. When the clustering unit 29 calculates the above-described scores, the feature vector sequences of the new unregistered word and the N already-stored unregistered words are needed, and they are obtained by referring to the feature vector buffer 28.

The clustering unit 29 adds the calculated scores to the score sheet (FIG. 8) together with the ID and the phoneme sequence of the new unregistered word. Thereafter, the process proceeds to step S15.

In step S15, the clustering unit 29 checks the score sheet (FIG. 8) to detect a cluster including a representative member which gives a highest score of the new unregistered word with respect to the representative member, s(N+1, i) (i=1, 2, ..., N). That is, the clustering unit 29 detects already-stored unregistered words employed as representative members on the basis of the representative member IDs described in the score sheet and further detects, on the basis of the scores described in the score sheet, an already-stored unregistered word employed as a representative member which gives a highest score to the new unregistered word. The clustering unit 29 then detects a cluster having a cluster number corresponding to the detected already-stored unregistered word employed as the representative member of that cluster.

Thereafter, the process proceeds to step S16. In step S16, the clustering unit 29 adds the new unregistered word to the cluster detected in step S15 (hereinafter, referred to simply as the detected cluster) as a member thereof. That is, the clustering unit 29 writes the cluster number of the representative member of the detected cluster, as the cluster number of the new unregistered word, into the score sheet.

In the next step S17, the clustering unit 29 divides the detected cluster into, for example, two clusters. Thereafter, the process proceeds to step 18. In step S18, the clustering unit 29 determines whether the detected cluster has been divided, in the cluster division process performed in step S17, into two clusters. If it is determined that the detected cluster has been divided into two clusters, then the process proceeds to step S19. In step S19, the clustering unit 29 determines the cluster-to-cluster distance between the two clusters obtained by dividing the detected cluster (hereinafter, such two clusters will be referred to as a first sub-cluster and a second sub-cluster).

The cluster-to-cluster distance between the first and second sub-clusters is defined, for example, as follows.

Herein, let k denote the ID of an arbitrary member (unregistered word) of the first and second sub-clusters, and let k1 and k2 denote the IDs of representative members (unregistered words) of the first and second sub-clusters, respectively. The cluster-to-cluster distance between the first and second sub-clusters is given by D(k1, k2) obtained by the following equation:

$$D(k1,k2) = \text{maxval}_k\{\text{abs}(\log(s(k,k1)) - \log(s(k,k2))\}) \quad (2)$$

In equation (2), abs( ) represent the absolute value of a value enclosed in parentheses ( ), $\text{maxval}_K\{\ \}$ represents the maximum value of values obtained by changing k of a variable enclosed in braces { }, and log represents a natural or common logarithm.

Herein, if a member whose ID is i is denoted as a member #i, the reciprocal of the score, 1/s(k, k1), corresponds to the distance between a member #k and a representative member k1, represented by equation (2), and the reciprocal of the score, 1/s(k, k2), corresponds to the distance between the member #k and a representative member k2. Thus, according to equation (2) the cluster-to-cluster distance between the first and second sub-clusters is given by the maximum difference between the distance of any member of the first and second sub-clusters relative to the representative member #k1 of the first sub-cluster and the distance of any member of the first and second sub-clusters relative to the representative member #k2 of the second sub-cluster.

Note that the definition of the cluster-to-cluster distance is not limited to that described above. For example, the sum of distances in the feature vector space is determined by means of the DP matching between the representative member of the first sub-cluster and the representative member of the second sub-cluster, and the sum of distances may be employed as the cluster-to-cluster distance.

After completion of step S19, the process proceeds to step 20. In step S20, the clustering unit 29 determines whether the cluster-to-cluster distance between the first and second sub-clusters is greater than (or equal to or greater than) a predetermined threshold ε.

If it is determined in step S20 that the cluster-to-cluster distance is greater than the predetermined threshold ε, that is, if it is determined that a plurality of unregistered words included as members in the detected cluster should be separated into two clusters from the point of view of acoustic features thereof, then the process proceeds to step S21. Instep S21, the clustering unit 29 registers the first and second sub-clusters into the score sheet stored in the score sheet memory 30.

That is, the clustering unit 29 assigns unique cluster numbers to the first and second sub-clusters, respectively, and updates the score sheet such that, of the cluster numbers of the respective members of the detected cluster, the cluster numbers of those members which have been clustered into the first sub-cluster are replaced with the cluster numbers of the first sub-cluster, and the cluster numbers of those members which have been clustered into the second sub-cluster are replaced with the cluster numbers of the second sub-cluster.

The clustering unit 29 updates the score sheet such that the ID of the representative member of the first sub-cluster is employed as the representative member ID of members clustered into the first sub-cluster and the ID of the representative member of the second sub-cluster is employed as the representative member ID of members clustered into the second sub-cluster.

The cluster number of the detected cluster may be employed as that of either one of the first or second sub-cluster.

After the clustering unit 29 has registered the first and second sub-clusters into the score sheet in the above-described manner, the process proceeds from step S21 to S22. In step S22, the maintenance unit 31 updates the word dictionary stored in the dictionary memory 25 on the basis of the score sheet. Thereafter, the process is ended.

That is, in this case, because the detected cluster has been divided into the first and second sub-clusters, the maintenance unit 31 first deletes the entry corresponding to the detected cluster from the word dictionary. The maintenance unit 31 then adds two entries corresponding to the first and second sub-clusters to the word dictionary and registers the phoneme sequence of the representative member of the first sub-cluster as the phoneme sequence of the entry corresponding to the first sub-cluster and the phoneme sequence of the representative member of the second sub-cluster as the phoneme sequence of the entry corresponding to the second sub-cluster.

On the other hand, in a case in which it is determined in step S18 that the detected cluster was not divided into two sub-clusters in the cluster division process in step S17, or in a case in which it is determined in step S20 that the cluster-to-cluster distance between the first and second sub-clusters is not greater than the predetermined threshold E (that is, in a case in which the acoustic features of the unregistered words included as members in the detected cluster are determined to be not so different that the detected cluster should be divided into the first and second sub-clusters), the process proceeds to step S23. In step S23, the clustering unit 29 determines a new representative member of the detected cluster and updates the score sheet.

That is, the clustering unit 29 refers to the score sheet stored in the score sheet memory 30 to detect scores s(k', k) needed in calculation of equation (1) for each member of the detected cluster to which the new unregistered word has been added as a member thereof. The clustering unit 29 determines the ID of a member to be employed as the new representative member of the detected cluster in accordance with equation (1) using the detected scores s(k', k) The clustering unit 29 then rewrites the score sheet (FIG. 8) such that the representative member ID of each member of the detected cluster is replaced with the ID of the new representative member of the detected cluster.

Thereafter, the process proceeds to step S22. In step S22, the maintenance unit 31 updates the word dictionary stored in the dictionary memory 25 on the basis of the score sheet, and the process is ended.

That is, in this case, the maintenance unit 31 refers to the score sheet to detect the new representative member of the detected cluster and further detect the phoneme sequence of that representative member. The maintenance unit 31 then updates the word dictionary by replacing the phoneme sequence of the entry corresponding to the detected cluster with the phoneme sequence of the new representative member of the detected cluster.

Figure 11:
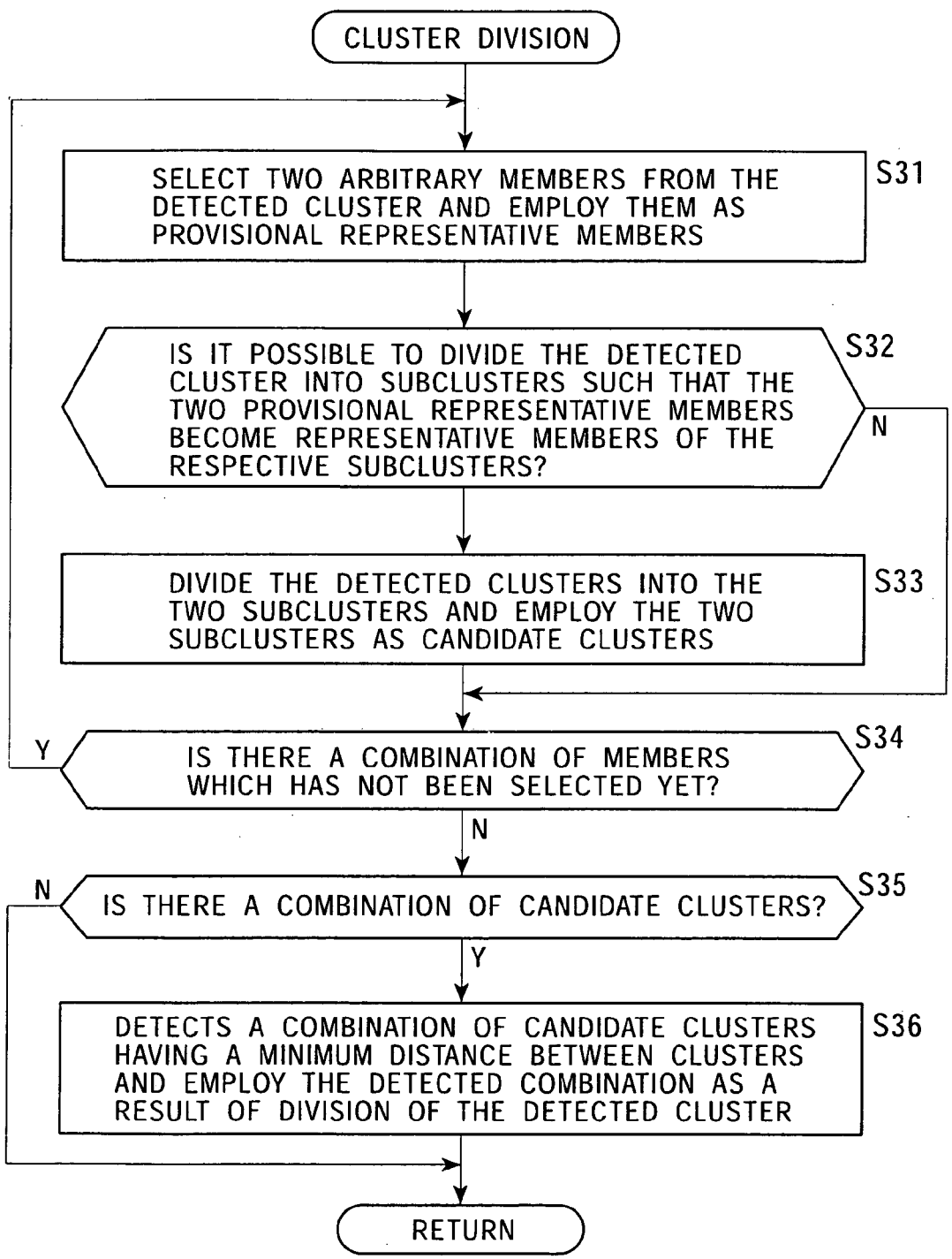
FIG. 11 is a flow chart showing the details of a cluster division process shown in FIG. 9.

Referring now to a flow chart shown in FIG. 11, the cluster division process in step S17 shown in FIG. 10 is described in further detail below.

In the cluster division process, first in step S31, the clustering unit 29 selects a combination of arbitrary two members, which have not been selected yet, from the detected cluster to which the new unregistered word has been added as a member, and the clustering unit 29 employs those two members as provisional representative members. Hereinafter, those two provisional representative members will be referred to as a first provisional representative member and a second provisional representative member, respectively.

In the next step S32, the clustering unit 29 determines whether the members of the detected cluster can be divided into two sub-clusters such that the first and second provisional representative members become the representative members of the respective two sub-clusters.

In order to determine whether the first and second provisional representative members can be the representative members, it is necessary to calculate equation (1), wherein the scores s(k', k) used in the calculation can be obtained by referring to the score sheet.

In a case in which it is determined in step S32 that the members of the detected cluster cannot be divided into two sub-clusters such that the first and second provisional representative members become the representative members of the respective two sub-clusters, the process jumps to step S34 without performing step S33.

However, if it is determined in step S32 that the members of the detected cluster can be divided into two sub-clusters such that the first and second provisional representative members become the representative members of the respective two sub-clusters, the process proceeds to step S33. In step S33, the clustering unit 29 divides the members of the detected cluster into two sub-clusters such that the first and second provisional representative members become the representative members of the respective two sub-clusters, and the clustering unit 29 employs the combination of the two sub-clusters as candidates for the final first and second sub-clusters into which the detected cluster should be divided (hereinafter, such candidates will be referred to as a combination of candidate sub-clusters). Thereafter, the process proceeds to step S34.

In step S34, the clustering unit 29 determines whether the detected cluster includes a combination of two members which has not yet been selected as a combination of first and second provisional representative members. If there is such a combination of two members, the process returns to step S31 to select a combination of two members, which has not yet been selected as a combination of first and second provisional representative members, from the members of the detected cluster. Thereafter, the process is performed in a similar manner as described above.

On the other hand, if it is determined in step S34 that there is no such a combination of two members of the detected cluster which has not yet been selected as a combination of first and second provisional representative members, the process proceeds to step S35. In step S35, the clustering unit 29 determines whether there is a combination of candidate sub-clusters.

If it is determined in step S35 that there is no combination of candidate sub-clusters, the flow exits from the process without performing step S36. In this case, it is determined in step S18 in FIG. 10 that the detected cluster cannot be divided.

On the other hand, if it is determined in step S35 that there is a combination of candidate sub-clusters, the process proceeds to step S36. In step S36, if there is a plurality of combinations of candidate sub-clusters, the clustering unit 29 determines the cluster-to-cluster distance between the two candidate sub-clusters for each combination of candidate sub-clusters. The clustering unit 29 then determines a combination of candidate sub-clusters having a minimum cluster-to-cluster distance and clustering unit 29 returns that combination of candidate sub-clusters as a result of division of the detected cluster, that is, as the first and second sub-clusters. In a case in which there is only one combination of candidate sub-clusters, those candidate sub-clusters are employed as the first and second sub-clusters.

In this case, it is determined in step S18 in FIG. 10 that the detected cluster has been divided.

As described above, the clustering unit 29 detects, from the existing clusters each including an unregistered word, a cluster (detected cluster) to which the new unregistered word is to be added as a member thereof, and the clustering unit 29 divides the detected cluster on the basis of the members of the detected cluster so that the new unregistered word becomes a new member of the detected cluster, thereby easily clustering the unregistered words such that unregistered words having similar acoustic features are clustered into the same cluster.

Furthermore, the maintenance unit 31 updates the word dictionary on the basis of the result of the clustering, and thus it becomes possible to easily register an unregistered word into the word dictionary without causing a great increase in the size of the word dictionary.

Furthermore, even if the matching unit 23 detects a wrong voice period for an unregistered word, such an unregistered word is clustered, in the process of dividing the detected cluster, into a cluster different from a cluster into which an unregistered word whose voice period has been correctly detected. Although an entry corresponding to the cluster in which the unregistered word has been improperly clustered is registered in the dictionary, the phoneme sequence never have a large contribution to the scores in voice recognition performed after that, because the phoneme sequence of that entry corresponds to the voice period which was not correctly detected. Therefore, even if a wrong detection occurs for a voice period of an unregistered word, the wrong detection does not have a significant influence on the following voice recognition.

FIG. 12 shows a result of a simulation of clustering for an utterance including an unregistered word. In FIG. 12, each entry (row) represents one cluster. In FIG. 12, a phoneme sequence of a representative member (unregistered word) of each cluster is described on the left-hand side, and an utterance of the unregistered word included as a member in the cluster and the number of utterances are described on the right-hand side.

More specifically, in FIG. 12, for example, in the entry in the first row, described is a cluster including, as only one member, an utterance of an unregistered word "風呂" (a Japanese word pronounced as "furo" and corresponding to an English word "bath"), and "doroa:" is obtained as the phoneme sequence of the representative member. As another example, in the entry in the second row, there is described a cluster including, as members, three utterances of the unregistered word "風呂" (bath), and "kuro" is obtained as the phoneme sequence of the representative member.

As still another example, in the entry in the seventh row, there is described a cluster including, as members, four utterances of an unregistered word "本" (a Japanese word pronounced as "hon" and corresponding to an English word "book"), and "NhoNde:su" is obtained as the phoneme sequence of the representative member. In the entry in the eighth row, there is described a cluster including, as members, one utterance of an unregistered word "オレンジ" a (Japanese word pronounced as "orenji" and corresponding to an English word "orange") and nineteen utterances of the unregistered word "本" (book), and "ohoN" is obtained as the phoneme sequence of the representative member. The other entries are also described in a similar manner.

As can be seen from FIG. 12, good results are obtained in clustering for utterances of the same unregistered word.

In the entry in the eighth row in FIG. 12, one utterance of the unregistered word "オレンジ" (orange) and nineteen utterances of the unregistered word "本" (book) are clustered into the same cluster. Judging from the utterances included as members in this cluster, this cluster should be of the unregistered word "本" (book). However, the cluster also includes as a member an utterance of the unregistered word "オレンジ" (orange). If utterances of the unregistered word "本" (book) are further input, then this cluster will be divided into a cluster including, as members, only utterances of the unregistered word "本" (book) and a cluster including, as a member, only the utterance of the unregistered word "オレンジ" (orange).

Although the present invention has been described above with reference to embodiments in which the invention is applied to the entertainment robot (pet robot), the invention can also be applied to a wide variety of apparatuses or systems in which a voice recognition apparatus is used, such as a voice interactive system. Furthermore, the present invention can be applied not only to actual robots that act in the real world but also to virtual robots such as that displayed on a display such as a liquid crystal display.

In the first embodiment described above, a sequence of processing is performed by executing the program using the CPU 10A. Alternatively, the sequence of processing may also be performed by dedicated hardware.

The program may be stored, in advance, in the, memory 10B (FIG. 2). Alternatively, the program may be stored (recorded) temporarily or permanently on a removable storage medium such as a flexible, a CD-ROM (Compact Disc Read Only Memory), an MO (Magnetooptical) disk, a DVD (Digital Versatile Disc), a magnetic disk, or a semiconductor memory. A removable storage medium on which the program is stored may be provided as so-called packaged software thereby allowing the program to be installed on the robot (memory 10B).

The program may also be installed into the memory 10B by downloading the program from a site via a digital broadcasting satellite and via a wireless or cable network such as a LAN (Local Area Network) or the Internet.

In this case, when the program is upgraded, the upgraded program may be easily installed in the memory 10B.

In the examples described above, the processing steps described in the program to be executed by the CPU 10A for performing various kinds of processing are not necessarily required to be executed in time sequence according to the order described in the flow chart. Instead, the processing steps may be performed in parallel or separately (by means of parallel processing or object processing).

The program may be executed either by a single CPU or by a plurality of CPUs in a distributed fashion.

The voice recognition unit 50A shown in FIG. 4 maybe realized by means of dedicated hardware or by means of software. When the voice recognition unit 50A is realized by software, a software program is installed on a general-purpose computer or the like.

Figure 13:
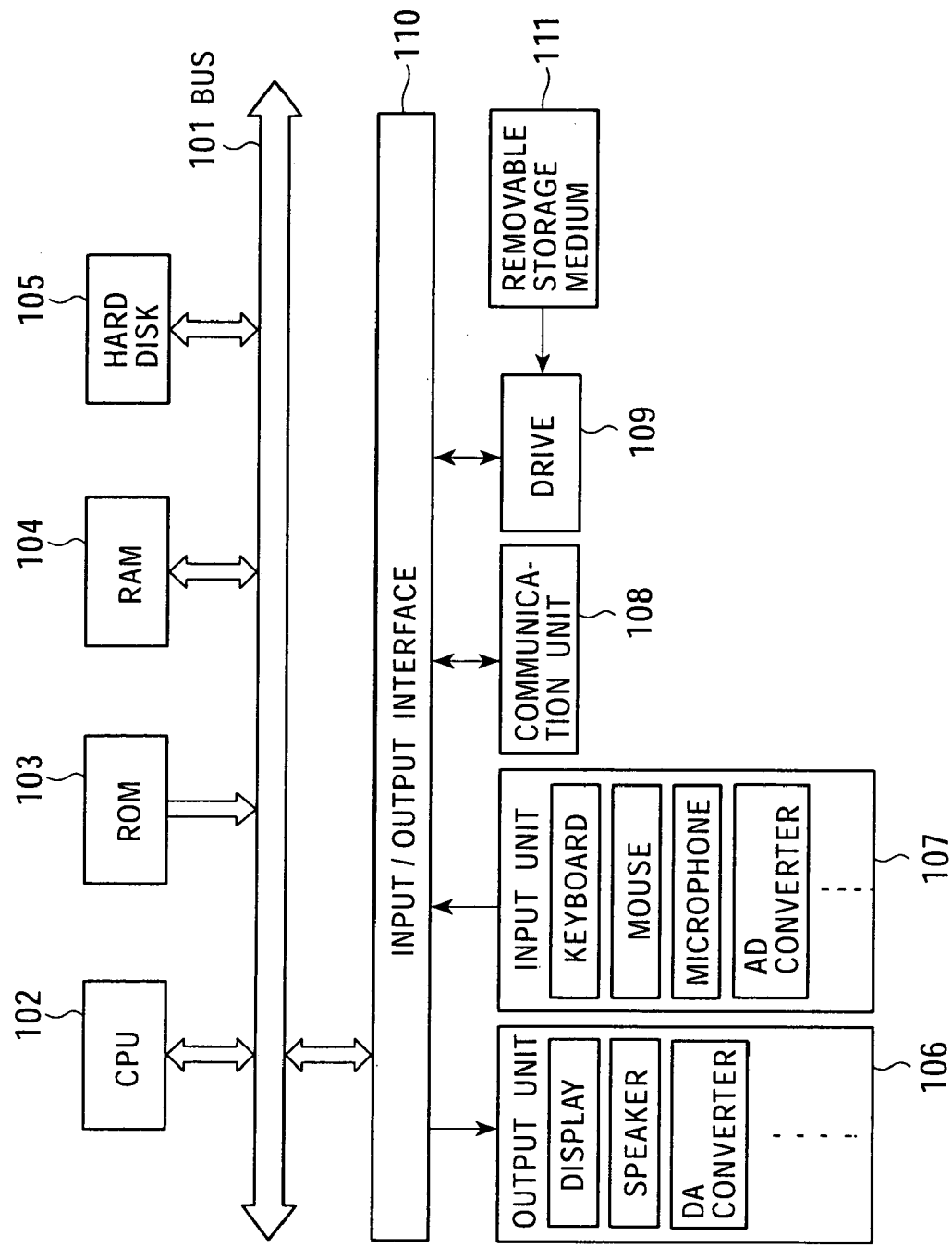
FIG. 13 is a diagram showing an example of a hardware configuration of a voice recognition apparatus according to a second embodiment of the present invention.

FIG. 13 illustrates an example of the configuration of a computer on which the program used to realize the voice recognition unit 50A is installed.

That is, another embodiment of a voice recognition apparatus 91 according to the present invention is shown in FIG. 13.

As shown in FIG. 13, the program may be stored, in advance, on a hard disk 105 serving as a storage medium or in a ROM 103 which are disposed inside the computer.

Alternatively, the program may be stored (recorded) temporarily or permanently on a removable storage medium 111 such as a flexible disk, a CD-ROM, an MO disk, a DVD, a magnetic disk, or a semiconductor memory. Such a removable storage medium 111 may be provided in the form of so-called package software.

Instead of installing the program from the removable storage medium 111 onto the computer, the program may also be transferred to the computer from a download site via a digital broadcasting satellite by means of wireless transmission or via a network such as an LAN (Local Area Network) or the Internet by means of cable communication. In this case, the computer receives, using a communication unit 108, the program transmitted in the above-described manner and installs the received program on the hard disk 105 disposed in the computer.

The voice recognition apparatus 91 includes a CPU (Central Processing Unit) 102. The CPU 102 is connected to an input/output interface 110 via a bus 101 so that when a command issued by operating an input unit 107 including a keyboard, a mouse, a microphone, and an AD converter is input via the input/output interface 110, the CPU 102 executes the program stored in a ROM (Read Only Memory) 103 in response to the command. Alternatively, the CPU 102 may execute a program loaded in a RAM (Random Access Memory) 104 wherein the program may be loaded into the RAM 104 by transferring a program stored on the hard disk 105 into the RAM 104, or transferring a program which has been installed on the hard disk 105 after being received from a satellite or a network via the communication unit 108, or transferring a program which has been installed on the hard disk 105 after being read from a removable recording medium 111 loaded on a drive 109. By executing the program, the CPU 102 performs the process described above with reference to the flow chart or the process described above with reference to the block diagrams. The CPU 102 outputs the result of the process, as required, to an output unit 106 including an LCD (Liquid Crystal Display), a speaker, and a DA (Digital Analog) converter via the input/output interface 110. The result of the process may also be transmitted via the communication unit 108 or may be stored on the hard disk 105.

Figure 14:
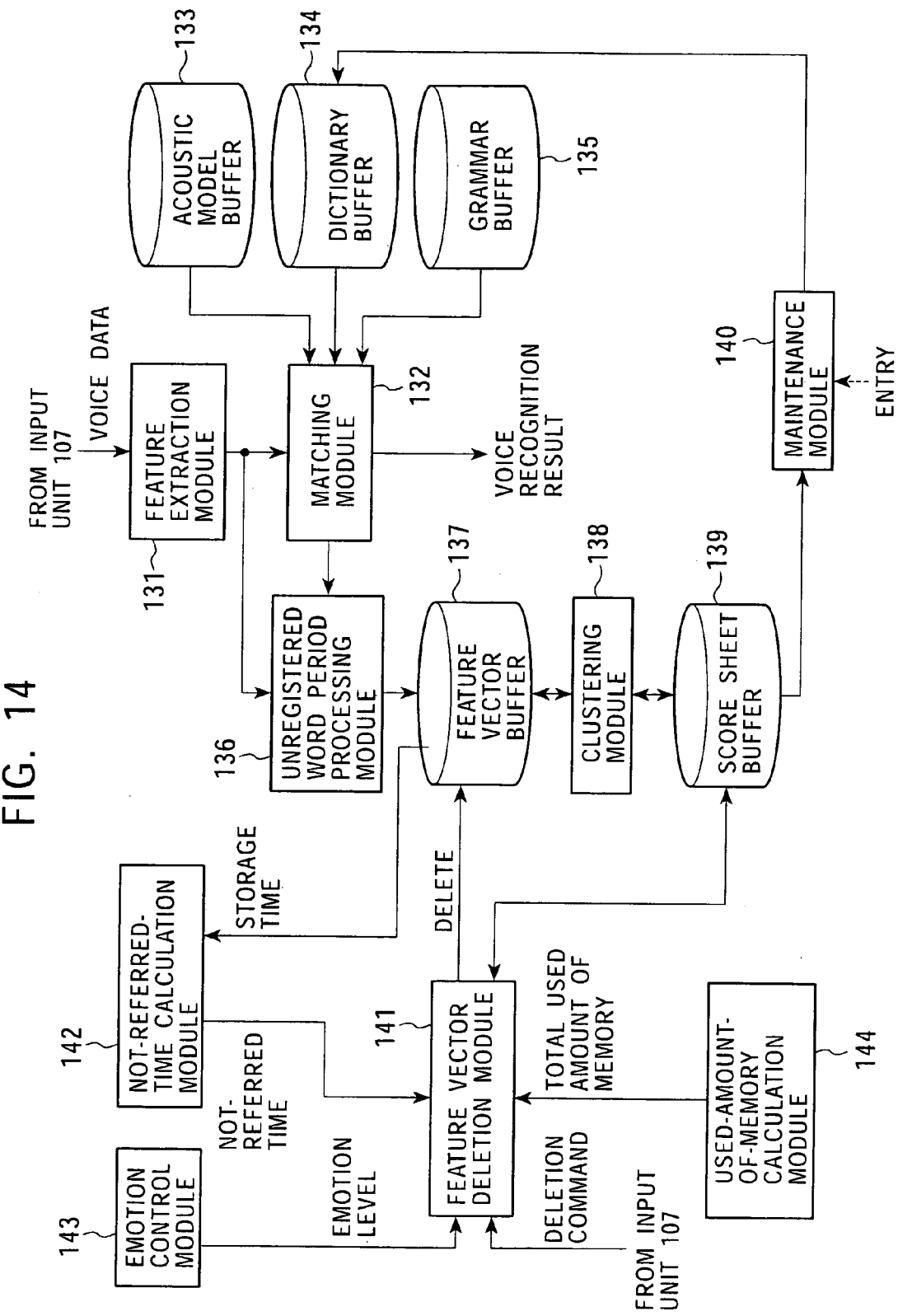
FIG. 14 is a diagram showing an example of a software configuration of the voice recognition apparatus shown in FIG. 13.

FIG. 14 shows an example of the configuration of the software program of the voice recognition apparatus 91. This software program includes a plurality of modules. Each module has its own independent algorithm, and each module executes a particular operation in accordance its algorithm. Each module is stored in the RAM 13 and read and executed by the CPU 11.

The respective modules shown in FIG. 14 correspond to the blocks shown in FIG. 4. More specifically, an acoustic model buffer 133 corresponds to the acoustic model memory 24, a dictionary buffer 134 to the dictionary memory 25, a grammar buffer 135 to the grammar memory 26, a feature extraction module 131 to the feature extraction unit 22, a matching module 132 to the matching unit 23, an unregistered word period processing module 136 to the unregistered word period processing unit 27, a feature vector buffer 137 to the feature vector buffer 28, a clustering module 138 to the clustering unit 29, a score sheet buffer 139 to the score sheet memory 30, and a maintenance module 140 to the maintenance unit 31.

Note that in the present example, in the input unit 107 shown in FIG. 13, an input analog voice signal obtained via the microphone is supplied to the AD converter, which converts the input analog voice signal to digital voice data by means of an A/D (Analog/Digital) conversion including sampling and quantizing, and the resultant digital voice data is supplied to the feature extraction module 131.

In the present example, the feature vector buffer 137 stores, for example, as shown in FIG. 15, an ID, a phoneme sequence, a feature vector sequence, and a storage time of an unregistered word supplied from the unregistered word period processing module 136 such that they are related to each other. In other words, the feature vector buffer 137 stores a set of data indicating entries (in rows) corresponding to respective unregistered words.

In the example shown in FIG. 15, sequential numerals starting from 1 are assigned to respective unregistered words. Therefore, for example, when IDs, phoneme sequences, feature vector sequences, and storage times for N unregistered words have been stored in the feature vector buffer 137, if the matching module 132 detects a voice period and a phoneme sequence of another unregistered word, the unregistered word period processing module 136 assigns N+1 as an ID to the detected unregistered word, and the feature vector buffer 137 stores the ID (N+1), the phoneme sequence, the feature vector sequence, and the storage time of that unregistered word as represented by broken lines in FIG. 15.

The entries shown in FIG. 15 are similar to the respective entries shown in FIG. 7 except that each entry shown in FIG. 15 includes additional data indicating a storage time. Each storage time indicates a time at which an entry is stored (recorded) into the feature vector buffer 137. The method of using the storage time will be described later.

As will be described later, when the clustering module 138 performs clustering on a new unregistered word, the clustering module 138 refers to the "feature vectors" stored in the feature vector buffer 137. Hereinafter, such "voice information", which is referred to when clustering is performed on an unregistered word, will be called "utterance information".

That is, the "utterance information" is not limited to "feature vectors" but a "PCM (Pulse Code Modulation) signal" such as voice data supplied to the feature extraction module 131 may also be employed as utterance information. In this case, the feature vector buffer 137 stores the "PCM signal" instead of the "feature vector sequence".

Thus, the voice recognition apparatus 91 formed of the modules described above can operate in a similar manner as the voice recognition unit 50A shown in FIG. 4, although the detailed structure and operation of the modules corresponding to the voice recognition unit 50A are not described herein.

The voice recognition unit 50A needs to store voice waveforms (for example, digital voice data) of clusters of unregistered words or feature vectors (for example, MFCCs (Mel Frequency Cepstrum Coefficients) obtained by performing MFCC analysis on digital voice data) as utterance information in a particular memory area or the feature vector buffer 28 serving as a memory so that the utterance information can be used to perform clustering on a newly input unregistered word.

That is, in the above-described process, when the voice recognition unit 50A detects a cluster to which an unregistered word is to be added as a new member, from existing clusters obtained by performing clustering on voices, the voice recognition unit 50A refers to the past utterance information stored in the particular storage area or the feature vector buffer 28 serving as the memory.

If the voice recognition unit 50A stores utterance information corresponding to all unregistered words one after another, then a large storage area or memory area is consumed with increasing number of input unregistered words (with increasing number of acquired unregistered words).

In the embodiment shown in FIG. 14, to avoid the above problem, there is additionally provided a feature vector deletion module 141 for, when a predetermined condition is satisfied, deleting particular utterance information and associated data from the feature vector buffer 137.

More specifically, for example, the feature vector deletion module 141 checks a score sheet, similar to that shown in FIG. 8, stored in the score sheet buffer 139 to determine whether the number of members belonging to a particular cluster has exceeded a predetermined first number. If it is determined that the number of such members is greater than the predetermined first number, the feature vector deletion module 141 deletes utterance information and associated data of a second number of members of the members belonging to the particular cluster from the feature vector buffer 137. Herein, data associated with a member includes an ID and a phoneme sequence of that member and also data of the member described on the score sheet.

Thus, the feature vector deletion module 141 prevents clusters from becoming greater than a predetermined size, thereby not only suppressing consumption of memory (such as the RAM 103) but also preventing a reduction in operation speed of the voice recognition apparatus 91, that is, preventing degradation in performance of the voice recognition apparatus 91.

Note that the first and second numbers described above are selected such that the first number is equal to or greater than the second number. The second number of members to be deleted may be selected, for example, in the order of storage time from oldest to newest according to the storage time data shown in FIG. 15.

Furthermore, if the feature vector deletion module 141 determines that data supplied from the not-referred-to time calculation module 142 indicates that a particular cluster has not been referred to at all over a period of time equal to or longer than a predetermined length, the feature vector deletion module 141 deletes utterance information and associated data of members of that particular cluster from the feature vector buffer 137.

More specifically, for example, the not-referred-to time calculation module 142 checks the feature vector buffer 137 to detect the latest one of times (storage times shown in FIG. 15) at which utterance information of respective members belonging to a particular cluster were stored into the feature vector buffer 137 (that is, the not-referred-to time calculation module 142 detects the time at which an entry of an unregistered word clustered last into the particular cluster was stored into the feature vector buffer 137), and the not-referred-to time calculation module 142 employs the detected latest time as the last reference time of that particular cluster.

The not-referred-to time calculation module 142 then subtracts the detected last reference time from the current time to determine the not-referred-to time during which the particular cluster has not been referred to and supplies the not-referred-to time to the feature vector deletion module 141.

Although in the present embodiment, the not-referred-to time calculation module 142 calculates the not-referred-to time for all clusters at predetermined time intervals, there is no limitation on the number of clusters the not-referred-to time of which is calculated. For example, the not-referred-to time calculation module 142 may calculate the not-referred-to time only for clusters specified by a user.

Furthermore, the method of the calculation performed by the not-referred-to time calculation module 142 is not limited to that described above. For example, although in the above example the not-referred-to time is calculated on the basis of the storage times stored in the feature vector buffer 137, the storage times are not necessarily needed to be stored in the feature vector buffer 137, but the not-referred-to time calculation module 142 may directly detect and store the last reference time of a particular cluster and may calculate the not-referred-to time on the basis of the stored last reference time.

In the above example, on the basis of the not-referred-to time supplied from the not-referred-to time calculation module 142, the feature vector deletion module 141 deletes utterance information and associated data of all members belonging to a cluster to which no new member has not been registered for a long time, from the feature vector buffer 137. Alternatively, instead of deleting all member of such a cluster, utterance information and associated data of only some members of the cluster may be deleted.

Furthermore, although in the example described above, the storage time of a member (unregistered word) registered last in a cluster is employed as the last reference time of that cluster, the last reference time of a cluster may be determined in a different manner. For example, a time at which a cluster is detected in step S15 in FIG. 10, or a time at which sub-clusters are registered in step S21, or a time at which a cluster is referred to in some process may be employed as the last reference time.

When the feature vector deletion module 141 receives a delete command (trigger signal) indicating that a particular cluster should be deleted via the input unit 107 (for example, a keyboard) the feature vector deletion module 141 may delete utterance information and associated data of part or all of members belonging to that particular cluster from the feature vector buffer 137.

When the voice recognition apparatus 91 is disposed on the pet robot shown in FIG. 1, if the feature vector deletion module 141 deletes a particular feature vector sequence in response to not an internal state of the voice recognition apparatus 91 but an external stimulus, amnesia due to a strong stimulus can be realized in the robot.

Furthermore, for example, if the level of emotion (emotion level) supplied from the emotion control module 143 is greater than a predetermined value (level), the feature vector deletion module 141 may delete utterance information and associated data of part or all of members belonging to a particular cluster from the feature vector buffer 137.

In a case in which the voice recognition apparatus 91 is provided in the robot shown in FIG. 1, the information control module 143 can be realized by the model memory 51 shown in FIG. 3. That is, in this case, the model memory 51 supplies information indicating an emotion level as state information to the feature vector deletion module 141, wherein the emotion level indicates the state of emotion, instinct, or growth indicated by a value of the emotion model, the instinct model, and the growth model.

If the feature vector deletion module 141 deletes particular utterance information stored in the feature vector buffer 137 on the basis of the emotion level (parameter value of emotion (value of a model)) supplied from the emotion control module 143, it is possible to realize a loss in memory in a robot in response to an occurrence of strong angry or the like in the robot shown in FIG. 1 (in response to an increase in the parameter associated with the "angry" beyond a predetermined value).

When the data supplied from the used-memory-area calculation module 144 indicates that the total amount of used memory space (for example, the memory space of the RAM 103 or the like, shown in FIG. 1, including the feature vector buffer 137 and the score sheet buffer 139) has exceeded a predetermined value, the feature vector deletion module 141 may delete utterance information and associated data of part or all of members belonging to a particular cluster from the feature vector buffer 137.

More specifically, the used-memory-area calculation module 144 always calculates the total amount of used memory space (total memory consumption amount) and supplies data indicating the total amount of used memory space to the feature vector deletion module 141 at predetermined time intervals.

As described above, the feature vector deletion module 141 always monitors the amount of memory consumption (of the RAM 103 or the like), and if the amount of memory consumption has exceeded the predetermined value, the feature vector deletion module 141 reduce the amount of memory consumption by deleting utterance information and associated data of members belonging to a cluster stored in the feature vector buffer 137, thereby not only suppressing consumption of memory (such as the RAM 103) but also preventing a reduction in operation speed of the voice recognition apparatus 91, that is, preventing degradation in performance of the voice recognition apparatus 91.

Although in the example described above, the feature vector deletion module 141 determines whether the value of a parameter has exceeded a predetermined value, wherein the parameter may be the number of members of a cluster (the number of entries associated with the respective members of the same cluster stored in the feature vector buffer 137), the not-referred-to time indicated by the not-referred-to time calculation module 142, the emotion level indicated by the emotion control module 143, or the memory consumption amount indicated by the used-memory-area calculation module 144, and if the feature vector deletion module 141 determines that the value of the parameter has exceeded the predetermined value, then the feature vector deletion module 141 determines that the predetermined condition is satisfied and the feature vector deletion module 141 deletes part or all of the members of the cluster, the method of deleting members (utterance information and associated data of members) is not limited to such a method.

For example, instead of making the judgment on the parameter value, the feature vector deletion module 141 may determine that the particular condition is satisfied when a trigger signal (such as a delete command supplied via the input unit 107) is input, and may delete particular utterance information.

In this case, the emotion control module 143, the not-referred-to time calculation module 142, and the used-memory-area calculation module 144 may make the above-described judgment on the parameter value, and if it is determined in the judgment process that the value of the parameter (the emotion level, the not-referred-to time, or the total amount of used memory space) associated with one of these modules is greater than the predetermined threshold, a trigger signal may be supplied to the feature vector deletion module 141.

The trigger signal supplied to the feature vector deletion module 141 is not limited to that described above, but another trigger signal such as that generated by a user when an arbitrary condition is satisfied may also be employed.

As described above, when the feature vector deletion module 141 determines that the particular condition is satisfied, the feature vector deletion module 141 deletes particular utterance information of members stored in the feature vector buffer 137. The utterance information deleted in the above process may be arbitrarily selected (set), and the number of pieces of utterance information deleted may also be arbitrarily selected (set). For example, a user or a manufacturer may set the conditions associated with deletion of utterance information.

In order to maintain the voice recognition accuracy of the voice recognition apparatus 91 at a high level without encountering a reduction in performance thereof, it is desirable to preferentially delete such members described below.

That is, in a case in which part of members of a cluster is deleted, if a representative member of that cluster or a member having a rather small distance relative to the representative member (that is, a member having a large score associated with the representative member) is deleted, a great change will occur in the structure itself of that cluster. Therefore, it is desirable to preferentially delete a member other than such the members described above.

On the other hand, members of a cluster including a small number of cluster, members having a large distance relative to a representative member, and members of a cluster to which a new member has not been added for a long time can be regarded as not having a large influence on the voice recognition accuracy, and thus it is desirable to preferentially delete such members.

When the feature vector deletion module 141 deletes utterance information and associated data of members stored in the feature vector buffer 137, the score sheet stored in the score sheet buffer 139 includes data associated with the deleted members.

Therefore, if the feature vector deletion module 141 deletes utterance information and associated data stored in the feature vector buffer 137, the feature vector deletion module 141 also deletes, from the score sheet, data associated with the members deleted from the feature vector buffer 137.

For example, if the feature vector deletion module 141 deletes data (ID, phoneme sequence, feature vector sequence (utterance information), and storage time) of an entry (in a row) of an ID of 3 shown in FIG. 15, then the feature vector deletion module 141 further deletes, from the score sheet shown in FIG. 8, data (ID, phoneme sequence, cluster number, representative member ID, and scores $s(3, i)$ ($i=1, \ldots, N+1$)) of an entry (in a row) of an ID of 3 and also deletes scores s(j, 3) (j=1, . . . , N+1) of member having the other IDs associated with the member of the ID of 3.

In this case, the clustering module 138 reselects (redetermines) a representative member of a cluster to which the deleted member belonged. In the specific example described above, the representative member of the cluster (with a cluster number of 1) to which the member having the ID of 3 belonged as shown in FIG. 8 is reselected (redetermined). If the reselected representative member is different from the previous one (that is, if a member having an ID other than 1 is reselected as a representative member), a possibility occurs that the structures of all clusters are changed. Thus, reclustering is performed on unregistered words having any ID.

The method of reclustering is not limited to a specific one, and, for example, a k-means method may be employed.

In this case, the clustering module 138 performs processes (1) to (3) described below, wherein it is assumed that N unregistered words are registered in the score sheet stored in the score sheet buffer 139 and these unregistered words are clustered into k clusters.

(1) Of the N unregistered words, arbitrary K unregistered words clustered into k clusters such that each of K unregistered words becomes an initial cluster center and the initial cluster center is employed as the provisional representative member.

(2) The scores of all data (N unregistered words) associated with the k representative members are recalculated, and each of the N unregistered words is registered as a member of a cluster including a representative member giving a highest recalculated score to the unregistered word.

(3) A representative member is selected for each of the k clusters into which members have been newly registered.

In the process (2) described above, the scores can be determined by referring to the score sheet without actually calculating the score. However, the clustering module 138 may actually calculate the scores in the process (2). In this case, utterance information of the N unregistered words is needed, wherein the unregistered word can be obtained by referring to the feature vector buffer 137.

When the clustering module 138 actually calculates the scores, if not feature vector sequences but PCM signals (voice data) are stored as utterance information in the feature vector buffer 137, the clustering module 138 calculates the scores on the basis of the PCM signals.

If, as a result of the reclustering using the k-means method, the structure of a cluster other than a cluster to which a deleted unregistered word previously belonged has been changed, the deletion of that unregistered word is regarded as having a large influence, and the clustering module 138 and the feature vector deletion module 141 cancel the deletion of that unregistered word and also cancel all processes (updating of the score sheet and the reclustering) a rising from the deletion so as to make associated data return back into the state in which the associated data was before the deletion was performed (by performing the undo process)

Figure 16:
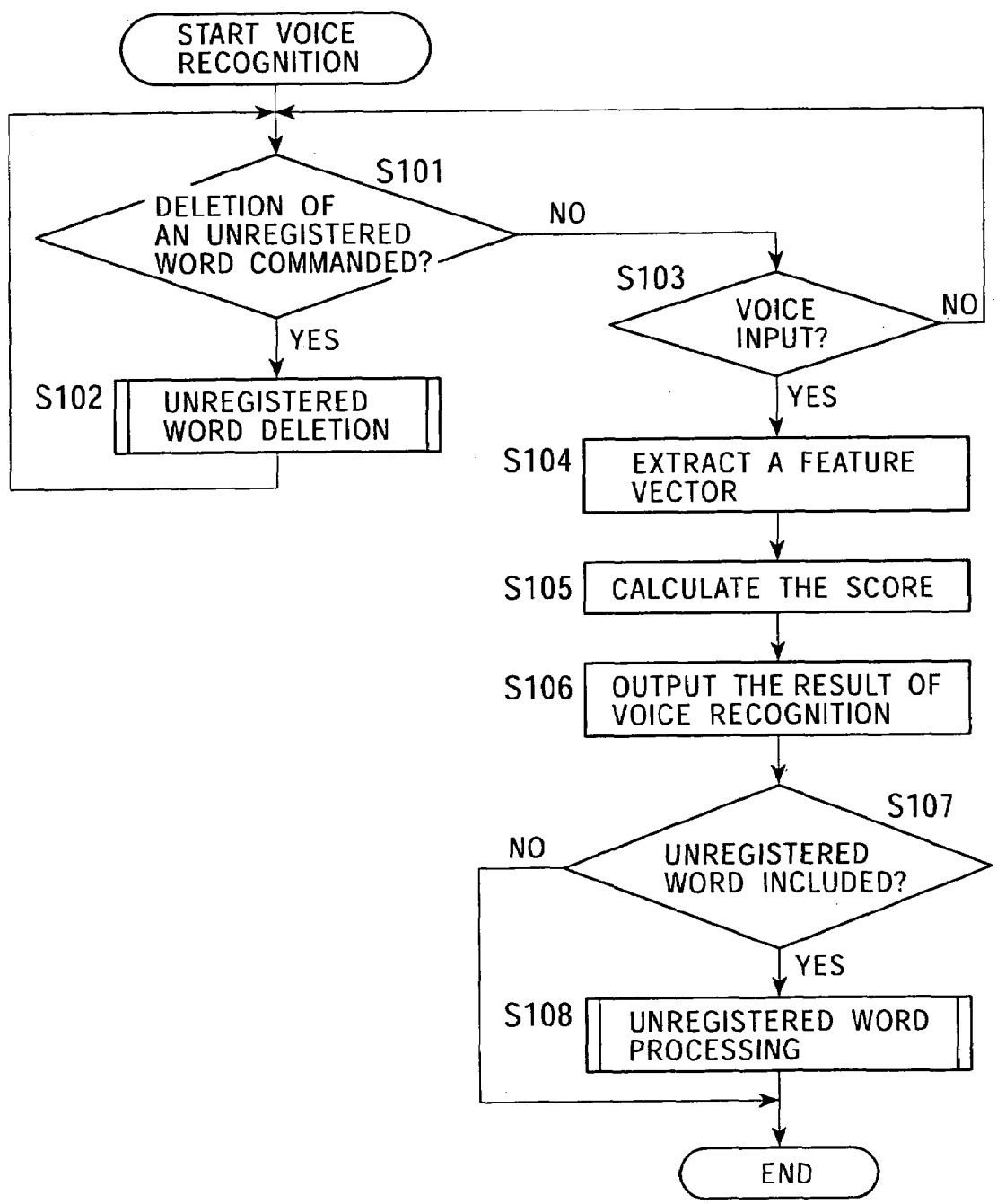
FIG. 16 is a flow chart showing a voice recognition process performed by the voice recognition apparatus shown in FIG. 14.

Referring now to a flow chart shown in FIG. 16, the voice recognition process performed by the voice recognition apparatus 91 shown in FIG. 14 is described.

In this example described below, it is assumed that the data shown in FIG. 15 is stored in the feature vector buffer 137, and the score sheet shown in FIG. 8 is stored in the score sheet buffer 139. Furthermore, it is assumed that utterance information is represented in the form of a feature vector sequence.

In step S101, the feature vector deletion module 141 determines whether a command for deleting an unregistered word has been issued.

In the present example, the feature vector deletion module 141 determines that the command for deleting an unregistered word has been issued, when one of conditions (1) to (5) described below is satisfied:

(1) if the number of members belonging to particular clusters of the clusters registered in the score sheet stored in the score sheet buffer 139 becomes greater than a predetermined number;

(2) if the data supplied from the not-referred-to time calculation module 142 indicates that the not-referred-to time of a particular cluster becomes longer than a predetermined time;

(3) if a delete command (trigger signal) is supplied via the input unit 107;

(4) if the value of a parameter of emotion (emotion level) supplied from the emotion control module 143 is greater than a predetermined value (level); or (5) if the data supplied from the used-memory-area calculation module 144 indicates that the total amount of used memory space (of the RAM 103 or the like) is greater than a predetermined value.

If the feature vector deletion module 141 determines in step S101 that the command for deleting an unregistered word has been issued, then the feature vector deletion module 141 executes, in the next step S102, an "unregistered word deletion routine" on the unregistered word commanded to be deleted (hereinafter, referred to as the unregistered word to be deleted). Thereafter, the process returns to step S101 to again determine whether an unregistered word is commanded to be deleted.

Figure 17:
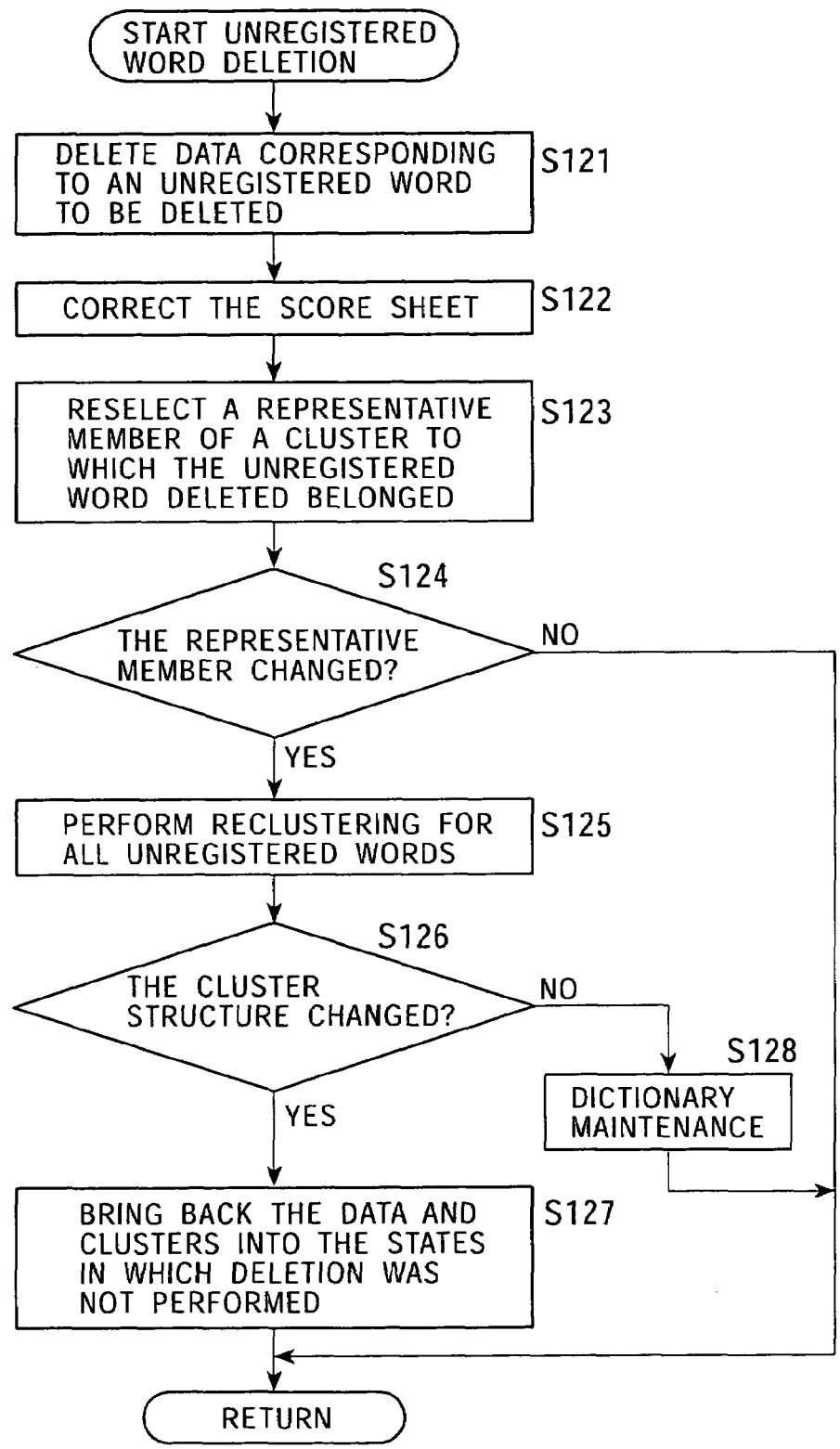
FIG. 17 is a flow chart showing the details of an unregistered word deletion process shown in FIG. 16.

The details of the "unregistered word deletion process" are described in FIG. 17. Referring to FIG. 17, the "unregistered word deletion process" is described below.

First, in step S121, the feature vector deletion module 141 deletes, of the data stored in the feature vector buffer 137, such data corresponding to an unregistered word to be deleted.

For example, in a case in which an unregistered word of an ID of 3 shown in FIG. 15 is to be deleted, of the data shown in FIG. 15, data (ID, phoneme sequence, feature vector (utterance information), and storage time) of an entry (in a row) of the ID of 3 is deleted.

Instep S122, the feature vector deletion module 141 corrects the score sheet stored in the score sheet buffer 139.

For example, if the data of the entry of the ID of 3 has been deleted in step S121 in the above-described manner, then, in step S122, of the data stored in the score sheet shown in FIG. 8, data (ID, phoneme sequence, cluster number, representative member ID, and scores s(3, i) (i=1, . . . , N+1)) of an entry (in a row) of the ID of 3 is deleted, and scores s(j, 3) (j=1, . . . , N+1) of unregistered words having IDs other than 3 associated with the deleted unregistered word having the ID of 3 are deleted.

In step S123, the clustering module 138 reselects (redetermines) a representative member for the cluster to which the deleted unregistered word previously belonged.

In this specific example, the unregistered word having the ID of 3 was deleted, and thus a representative member for a cluster having a cluster number of 1 (to which the unregistered word having the ID of 3 previously belonged) described in the score sheet shown in FIG. 8 is reselected in the above-described manner.

In step S124, the clustering module 138 determines whether the reselected representative member is different from the previous representative member (that is, whether the representative member reselected in step S123 is different from the immediately previous representative member). If no change is detected in the representative member, the flow returns. That is, step S102 in FIG. 16 is ended and the process returns to step S101 to repeat the process from step S101.

For example, in a case in which a member having an ID of 1 was reselected in step S123 as the representative member, it is determined that no change has occurred in the representative member. On the other hand, in a case in which a member having an ID other than 1 was reselected as the representative member, it is determined that the representative member has been changed.

In a case in which the clustering module 138 has determined in step S124 that the representative member has been changed, the process proceeds to step S125 in which the clustering module 138 performs reclustering on all unregistered words (in the present example, all unregistered words registered in the score sheet shown in FIG. 8 except for the unregistered word having the ID of 3). That is, the clustering module 138 performs reclustering on all unregistered words by means of, for example, the k-means method described earlier.

In step S126, the clustering module 138 determines whether a change has occurred in the structure of a cluster other than the cluster to which the deleted unregistered word previously belonged (more specifically, for example, clustering module 138 determines whether a change in terms of members belonging to a cluster has occurred or whether a representative member of a cluster has been changed to another member). If it is determined that no change has occurred in cluster structure, the process proceeds to step S128. In step S128, the maintenance module 140 updates the word dictionary stored in the dictionary buffer 134 on the basis of the score sheet updated (corrected) in step S122. Thereafter, the flow returns.

That is, in the present case, when a new representative member for the cluster to which the deleted unregistered word previously belonged is reselected (in step S123), the new representative member is different from the previous representative member (step S124), and thus maintenance module 140 refers to the score sheet to detect clusters whose representative members have been redetermined. The maintenance module 140 registers, in the word dictionary stored in the dictionary buffer 134, the phoneme sequences of the new representative members as the phoneme sequences of entries corresponding to the clusters whose representative member has been redetermined.

On the other hand, if the clustering module 138 determines in step S126 that a change has occurred in cluster structure, then, in step S127, the clustering module 138 and the feature vector deletion module 141 return the contents of the feature vector buffer 137 and the score sheet buffer 139 into the states in which they were before deletion was performed (in step S121). That is, the clustering module 138 and the feature vector deletion module 141 perform the undo process until the state, in which associated data was before the unregistered words were deleted, is reached. Thereafter, the flow returns.

The process (undo process) in steps S126 and S127 may be removed. That is, in the voice recognition apparatus 91, a change of a cluster may be allowed, and the undo process may not be performed.

The voice recognition apparatus 91 may be constructed such that whether steps S126 and S127 should be performed or not can be selected (by a user or the like) from the outside of the voice recognition apparatus 91.

In a case in which all members of a cluster are determined as unregistered words to be deleted in the unregistered word deletion process in FIG. 17, and thus all members are deleted, the unregistered word deletion process is equivalent to deleting the cluster itself the members belong to. In this case, it is not necessary to determine a new representative member for that cluster (it is impossible to determine a new representative member) Therefore, in this case, after completion of step S122, steps S123 and S124 are skipped and the flow proceeds to step S125 and then to S126. If it is determined in step S126 that no change in cluster structure has occurred, the process proceed to step S128. In step S128, the maintenance module 140 updates the word dictionary stored in the dictionary buffer 134 on the basis of the score sheet updated (corrected) in step S122. Thereafter, the flow returns.

More specifically, in this case, all members of a certain cluster are deleted, and thus the cluster itself is deleted. The maintenance module 140 refers to the score sheet to detect the deleted cluster. The maintenance module 140 then deletes an entry corresponding to the deleted cluster from the word dictionary stored in the dictionary buffer 134.

By deleting an entry corresponding to a certain cluster from the word dictionary stored in the dictionary buffer 134 in the above-described manner, amnesia or a loss in memory is realized.

Referring again to FIG. 16, if it is determined in step S101 that no unregistered word is commanded to be deleted, then, in step S102, the feature extraction module 131 determines whether a voice has been input.

If it is determined in step S102 that no voice has been input, the flow returns to step S101 to repeat the process from step S101.

That is, the feature vector deletion module 141 always checks whether deletion of an unregistered word (utterance information of an unregistered word stored in the feature vector buffer 137) has been commanded, and the feature extraction module 131 always checks, independently of the feature vector deletion module 141, whether a voice has been input.

Herein, if a user utters, then the uttered voice is passed through the microphone and the AD converter in the input unit 107 thereby obtaining digital voice data. The resultant digital voice data is supplied to the feature extraction module 131.

In step S103, the feature extraction module 131 determines whether a voice has been input. If a voice is input (if it is determined that a voice has been input), then, in step S104, acoustic analysis is performed on the voice data on a frame-by-frame basis thereby extract feature vectors. The sequence of the extracted feature vectors is supplied to the matching module 132 and the unregistered word period processing module 136.

Steps S104 to S108 are similar to steps S1 to S5 described above with reference to FIG. 9, and thus steps S104 to S108 are not described herein.

As described above, if the feature vector deletion module 141 determines that the specific condition is satisfied, feature vector deletion module 141 deletes, from the data stored in the feature vector buffer 137, utterance information (feature vector sequence in the example shown in FIG. 15) of a member regarded as having little influence on clustering and associated data (ID, phoneme sequence, and storage time in the example shown in FIG. 15), thereby suppressing the consumption of the storage area without causing degradation in the function of automatically acquiring unregistered words.

Furthermore, the feature vector deletion module 141 corrects data related to the member (deletes unnecessary data) described in the score sheet stored in the score sheet buffer 139 thereby further suppressing the consumption of the storage area.

Furthermore, the maintenance module 140 updates the word dictionary on the basis of the corrected score sheet. This makes it possible to realize amnesia or a loss in memory in the robot, thereby making the robot capable of providing greater entertainment to users.

In the embodiments described above, the steps described in the program stored in the storage medium may be performed either in time sequence in accordance with the order described in the program or in a parallel or separate fashion.

Furthermore, there are no particular limitations on the details of the respective modules shown in FIG. 14, as long as the modules provide necessary functions. For example, modules may be constructed by means of hardware. In this case, a manufacturer may connect the respective modules in the manner shown in FIG. 14. In other words, instead of the voice recognition unit 50A shown in FIG. 3, the apparatus realized by means of hardware constructed in the manner shown in FIG. 14 may be used as the voice recognition unit.

In the embodiments described above, voice recognition is performed by means of the HMM method. However, in the present invention, voice recognition may also be performed by means of another method such as a DP matching method. In the case in which voice recognition is performed by means of the DP matching method, the score employed in the above-described embodiments correspond to the reciprocal of the distance between an input voice and a standard pattern.

In the embodiments described above, an unregistered word is clustered and the unregistered word is registered in the word dictionary on the basis of the result of clustering. The present invention may also be applied to a word which is already registered in the word dictionary.

That is, because there is a possibility that different phoneme sequences are obtained for utterances of the same word, if only one phoneme sequence is registered for one word in the word dictionary, then there occurs a possibility that an utterance of the word is not correctly recognized as that word if the phoneme sequence obtained for the utterance is different from that registered in the word dictionary. In the present invention, the above problem can be solved as follows. That is, different utterances of the same word are clustered such that acoustically similar utterances belong to the same cluster, and the dictionary is updated on the basis of the result of the clustering. As a result, different phoneme sequences are registered for the same word in the word dictionary, and thus it becomes possible to perform voice recognition for various phonemes for the same word.

In the word dictionary, in addition to phoneme sequence, key information may be described in an entry corresponding to a cluster of an unregistered word, as described below.

For example, in the action decision unit 52, state recognition information output from the image recognition unit 50B or the pressure processing unit 50C is supplied to the voice recognition unit 50A as represented by a broken line in FIG. 3 so that the maintenance unit 31 (FIG. 4) in the voice recognition unit 50A receives the state recognition information.

On the other hand, the feature vector buffer 28 and the score sheet memory 30 also store an absolute time at which an unregistered word was input. On the basis of the absolute time described in the score sheet stored in the score sheet memory 30, the maintenance unit 31 detects the state recognition information which was supplied from the action decision unit 52 when the unregistered word was input, and maintenance unit 31 regards the detected state recognition information as key information of that unregistered word.

The maintenance unit 31 registers, in the word dictionary, the state recognition information as key information in an entry corresponding to a cluster of the unregistered word so that the entry includes the state recognition information in addition to the phoneme sequence of the representative member of that cluster.

This makes it possible for the matching unit 23 to output, as a result of voice recognition for the unregistered word registered in the word dictionary, the state recognition information registered as the key information of the unregistered word. Furthermore, it becomes possible to make the robot take an action in accordance with the state recognition information registered as the key information.

More specifically, for example, when a word "red" is unregistered, if the CCD 16 detects an image of a red object, state recognition information indicating that a red object has been detected is supplied from the image recognition unit 50B to the voice recognition unit 50A via the action decision unit 52. Herein, if a user utters "red", which is an unregistered word, then the voice recognition unit 50A determines a phoneme sequence of the unregistered word "red".

In this case, the voice recognition unit 50A adds, as an entry of the unregistered word "red" to the word dictionary, the phoneme sequence of the unregistered word "red" and the key information indicating the state recognition information "red".

If a user utters "red" thereafter, the phoneme sequence of the unregistered word "red" registered in the word dictionary has a high score for the utterance, and thus the voice recognition unit 50A outputs, as a result of voice recognition, the state recognition information "red" registered as the key information.

The result of the voice recognition is supplied from the voice recognition unit 50A to the action decision unit 52. In response, for example, the action decision unit 52 may make the robot search the environment for the red object on the basis of the output from the image recognition unit 50B and walk toward the red object.

That is, in this specific example, although the robot cannot recognize an utterance of "red" when the robot encounters it for the first time, if a user utters "red" when the robot is detecting an image of an red object, then the robot relates the utterance "red" to the red object being detected as the image, thereby making is possible for the robot to, when the user utters "red" thereafter, recognize the utterance correctly as "red" and walk toward a red object present in the environment. This gives the user an impression that the robot grows by learning what the user speaks.

The voice recognition apparatus 91 shown in FIG. 13 may also operate in a similar manner.

Although in the embodiments described above, the scores are stored in the score sheet, the scores may be recalculated as required.

Although in the embodiments described above, the detected cluster is divided into two clusters, the detected cluster may be divided into three or more clusters. The detected cluster may also be divided into an arbitrary number of clusters such that the distances among the clusters become greater than a predetermined value.

In the embodiments described above, not only scores but also phoneme sequences, cluster numbers, and representative member IDs are registered in the score sheet (FIG. 8). Information other than the scores is not necessarily needed to be registered in the score sheet, but may be stored and managed separately from the scores.

INDUSTRIAL APPLICABILITY

According to the present invention, a cluster to which an input voice is to be added as a member is detected from existing clusters obtained by clustering voices. The input voice is added as a new member to the detected cluster, and the cluster is divided depending on the members of the cluster. On the basis of the result of the division, the dictionary is updated. Thus, it becomes possible to easily register, into the dictionary, a word which has not been registered in the dictionary without resulting in a significant increase in the size of the dictionary.

The invention claimed is:

1. A voice recognition apparatus for processing an input voice and updating a dictionary used in a language processor in accordance with a result of the processing of the input voice, said voice recognition apparatus comprising:
cluster detection means for detecting, from existing clusters obtained by clustering voices, a cluster to which said input voice is to be added as a new member;
cluster division means for employing said input voice as the new member of the cluster detected by said cluster detection means and dividing said cluster depending on members of said cluster; and
update means for updating the dictionary on the basis of a result of division performed by said cluster division means
wherein the dictionary stores a phoneme sequence of a vocabulary to be recognized, and
wherein the update means updates the dictionary by adding, as a new entry to the dictionary, a phoneme sequence of a voice corresponding to a representative member representing members of a cluster created by the division or by replacing an entry of the dictionary with the phoneme sequence of the voice corresponding to the representative member representing members of the cluster created by the division.

2. A voice recognition apparatus according to claim 1, wherein said cluster division means divides the cluster by means of an EM (Expectation Maximum) method.

3. A voice recognition apparatus according to claim 1, wherein said cluster detection means calculates the score of the input voice with respect to each member of the cluster by determining the likelihood that the input voice is observed in the member of the cluster; and selects, from the members of the cluster, a member giving a highest value to said score of the input voice and employs the selected member as a representative member representing the members of the cluster; and
determines the cluster having said representative member as a cluster to which the said input voice it to be added as a new member.

4. A voice recognition apparatus according to claim 1, wherein said input voice is an unregistered word which has not been registered, in advance, in the dictionary.

5. A voice recognition apparatus according to claim 3, wherein in a case in which, of members of the cluster, a member having a greatest sum of scores with respect to the other members of that cluster is employed as the representative member representing the members of that cluster, said cluster division means divides the cluster, to which the input voice has been added, into two clusters, that is, first and second clusters, such that two members of the original cluster become representative members of the first and second clusters, respectively.

6. A voice recognition apparatus according to claim 5, wherein in a case in which there are a plurality of combinations of two clusters consisting of first and second clusters, said cluster division means divides a cluster including the input voice as a member thereof into two clusters such that the cluster-to-cluster distance between the first cluster and the second cluster becomes smallest.

7. A voice recognition apparatus according to claim 6, wherein when a combination of two clusters consisting of first and second clusters is selected such that the cluster-to-cluster distance between the first cluster and the second cluster becomes smallest, if said smallest cluster-to-cluster distance is greater than a predetermined threshold, then said cluster division means divides the cluster including the input voice as a member thereof into said two clusters.

8. A voice recognition apparatus according to claim 5, further comprising storage means for storing the scores of the members of said cluster with respect to each member of each score.

9. A voice recognition apparatus according to claim 1, wherein the dictionary stores a phoneme sequence of a vocabulary to be recognized, and wherein said voice recognition apparatus further comprises voice recognition means for recognizing a voice on the basis of an acoustic model constructed in accordance with the phoneme sequence stored in said dictionary.

10. A voice recognition apparatus according to claim 9, wherein said acoustic model is an HMM (Hidden Markov Model).

11. A voice recognition apparatus according to claim 9, wherein said voice recognition means constructs an acoustic model corresponding to a phoneme sequence stored in the dictionary by concatenating HMMs in units of sub-words and recognizes a voice on the basis of said acoustic model.

12. A voice recognition apparatus according to claim 9, wherein said voice recognition means recognizes a voice also on the basis of a predetermined grammatical rule.

13. A voice recognition apparatus according to claim 12, wherein said voice recognition means extracts a particular period of the input voice in accordance with the predetermined grammatical rule; and
said cluster detection means and said cluster division means perform their processes on said period of the input voice.

14. A voice recognition apparatus according to claim 13, wherein said voice recognition means extracts, as said particular period, a period of an unregistered word which is not registered in the dictionary from the input voice.

15. A voice recognition apparatus according to claim 14, wherein said voice recognition means extracts the period of the unregistered word in accordance with the predetermined grammatical rule using a garbage model.

16. A voice recognition apparatus according to claim 1, further comprising:
storage means for storing voice information associated with the input voice for use by the cluster detection means to detect a cluster; and
deletion means for, when it is determined that a specific condition is satisfied, deleting a particular one of pieces of voice information stored in the storage means.

17. A voice recognition apparatus according to claim 16, wherein the voice information stored in the storage means is digital data of the input voice.

18. A voice recognition apparatus according to claim 17, further comprising feature extraction means for extracting a feature vector indicating a specific feature of the input voice from the digital data of the input voice, wherein the voice information stored in the storage means is the feature vector of the input voice extracted by the feature extraction means.

19. A voice recognition apparatus according to claim 16, wherein said deletion means determines that the specific condition is satisfied when the number of members belonging to the specific cluster is greater than a predetermined value.

20. A voice recognition apparatus according to claim 16, further comprising not-referred-to time calculation means for calculating the not-referred-to time during which the cluster has not been referred to, wherein said deletion means determines that the specific condition is satisfied when the not-referred-to time of the cluster calculated by the not-referred-to time calculation means is greater than a predetermined value.

21. A voice recognition apparatus according to claim 16, further comprising input means for inputting a trigger signal, wherein said deletion means determines that the specific condition is satisfied when the trigger signal is input via the input means.

22. A voice recognition apparatus according to claim 16, further comprising emotion control means for controlling a parameter associated with emotion, wherein said deletion means determines that the specific condition is satisfied when the value of the parameter associated with emotion controlled by the emotion control means is greater than a predetermined value.

23. A voice recognition apparatus according to claim 16, further comprising used-memory-area calculation means for calculating the amount of used memory area of the storage means, wherein said deletion means determines that the specific condition is satisfied when the amount of used memory area calculated by the used-memory-area calculation means is greater than a predetermined value.

24. A voice recognition apparatus according to claim 16, further comprising clustering means for reclustering a voice corresponding to voice information stored in the storage means.

25. A voice recognition apparatus according to claim 24, wherein said update means updates the dictionary also on the basis of a result of reclustering performed by the clustering means.

26. A voice recognition apparatus according to claim 24, further comprising representative member selection means for, when the voice information is deleted by the deletion means, selecting a representative member representing the members of the cluster to which the voice corresponding to the deleted voice information belongs before being deleted, wherein if the new representative member selected by the representative member selection means is different from a previous representative member, said clustering means reclusters all voice information stored in the storage means.

27. A voice recognition apparatus according to claim 26, further comprising deletion cancel means for if the structure of the cluster reclustered by the clustering means is different from the immediately previous structure the cluster had before being reclustered by the clustering means, canceling the deletion process performed, by the deletion means, on the voice information such that the original state is obtained.

28. A voice recognition apparatus according to claim 26, wherein said clustering means performs reclustering by means of a k-means method.

29. A voice recognition method for processing an input voice and updating a dictionary used in a language processor in accordance with a result of the processing of the input voice, said voice recognition method comprising the steps of:
　detecting, from existing clusters obtained by clustering voices, a cluster to which said input voice is to be added as a new member;
　employing said input voice as the new member of the cluster detected in said cluster detection step and dividing said cluster depending on members of said cluster; and
　updating the dictionary on the basis of a result of division performed in said cluster division step
　wherein the dictionary stores a phoneme sequence of a vocabulary to be recognized, and
　wherein the update means updates the dictionary by adding, as a new entry to the dictionary, a phoneme sequence of a voice corresponding to a representative member representing members of a cluster created by the division or by replacing an entry of the dictionary with the phoneme sequence of the voice corresponding to the representative member representing members of the cluster created by the division.

30. A computer-readable medium storing a computer program for causing a computer to perform voice processing for processing an input voice and updating a dictionary used in a language processor in accordance with a result of the processing of the input voice, said program comprising the steps of:
　detecting, from existing clusters obtained by clustering voices, a cluster to which said input voice is to be added as a new member;
　employing said input voice as the new member of the cluster detected in said cluster detection step and dividing said cluster depending on members of said cluster; and
　updating the dictionary on the basis of a result of division performed in said cluster division step
　wherein the dictionary stores a phoneme sequence of a vocabulary to be recognized, and
　wherein the update means updates the dictionary by adding, as a new entry to the dictionary, a phoneme sequence of a voice corresponding to a representative member representing members of a cluster created by the division or by replacing an entry of the dictionary with the phoneme sequence of the voice corresponding to the representative member representing members of the cluster created by the division.

* * * * *